Feb. 7, 1956  H. P. LUHN  2,733,862
BINARY DECADE COUNTER
Filed Dec. 26, 1952  11 Sheets-Sheet 1

INVENTOR
HANS P. LUHN
BY
AGENT

Feb. 7, 1956  H. P. LUHN  2,733,862
BINARY DECADE COUNTER
Filed Dec. 26, 1952  11 Sheets-Sheet 2

INVENTOR
HANS P. LUHN
BY
Harry T. Berriman
AGENT

Feb. 7, 1956  H. P. LUHN  2,733,862
BINARY DECADE COUNTER
Filed Dec. 26, 1952  11 Sheets-Sheet 3
FIG.4.
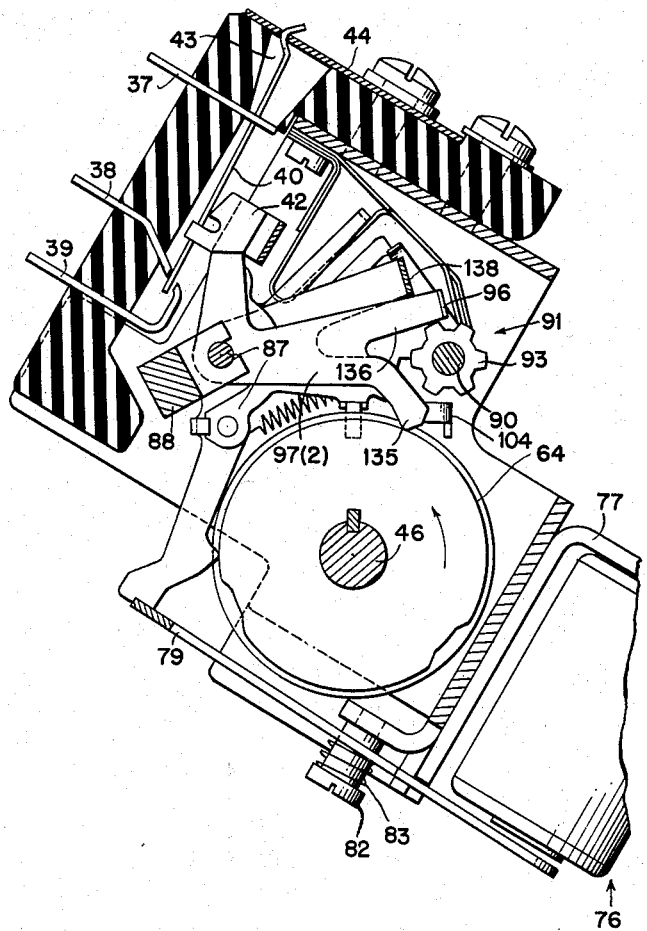
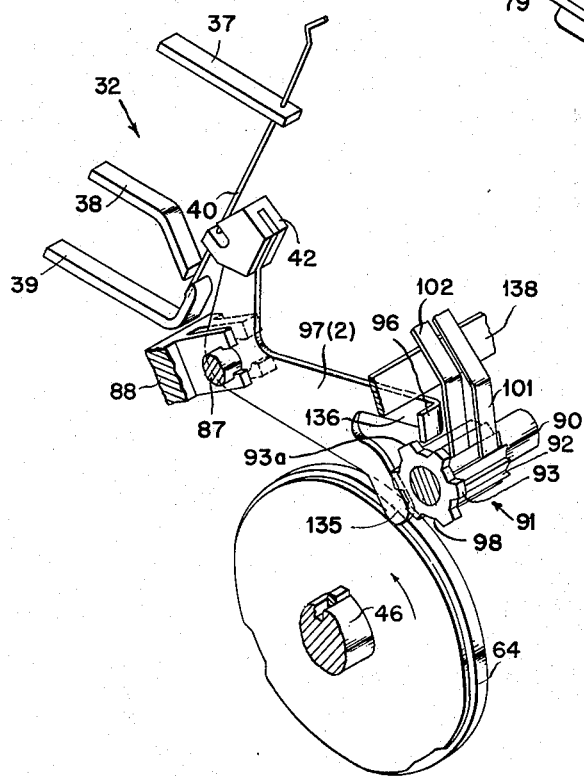
FIG.5.
INVENTOR
HANS P. LUHN
BY
AGENT Feb. 7, 1956   H. P. LUHN   2,733,862
BINARY DECADE COUNTER
Filed Dec. 26, 1952   11 Sheets-Sheet 4

INVENTOR
HANS P. LUHN
BY Harry T. Berriman
AGENT

Feb. 7, 1956　　　H. P. LUHN　　　2,733,862
BINARY DECADE COUNTER
Filed Dec. 26, 1952　　　11 Sheets-Sheet 5

INVENTOR
HANS P. LUHN
BY
AGENT

Feb. 7, 1956  H. P. LUHN  2,733,862
BINARY DECADE COUNTER
Filed Dec. 26, 1952  11 Sheets-Sheet 6

INVENTOR
HANS P. LUHN
BY Harry T. Berriman
AGENT

Feb. 7, 1956  H. P. LUHN  2,733,862
BINARY DECADE COUNTER
Filed Dec. 26, 1952  11 Sheets-Sheet 7

Feb. 7, 1956   H. P. LUHN   2,733,862
BINARY DECADE COUNTER
Filed Dec. 26, 1952   11 Sheets-Sheet 10

INVENTOR
HANS P. LUHN
BY Harry T. Berriman
AGENT

Feb. 7, 1956 H. P. LUHN 2,733,862
BINARY DECADE COUNTER
Filed Dec. 26, 1952 11 Sheets-Sheet 11

INVENTOR
HANS P. LUHN
BY Harry T. Berriman
AGENT

United States Patent Office 2,733,862
Patented Feb. 7, 1956

2,733,862
BINARY DECADE COUNTER

Hans P. Luhn, Armonk, N. Y., assignor to International Business Machines Corporation, New York, N. Y., a corporation of New York Application December 26, 1952, Serial No. 328,015

22 Claims. (Cl. 235—61.6)

This invention relates to counting devices and more particularly to an electro-mechanical accumulating device of the binary-decimal type.

In its preferred form, an embodiment of the invention may comprise an integral single order accumulating unit which may be cascaded with similar units to form a multi-order accumulating machine. The accumulating unit may comprise five electromagnet controlled counting members which are mechanically interconnected in such a manner so as to accumulate in accordance with the rules of the binary number system. In the binary number system, there are only two numeric symbols; a "binary one" and a "binary zero." Each of the five counting members is accordingly adapted to occupy either of two distinctive positions; one position being representative of a "binary one" and the other position being representative of a "binary zero."

Each of the five counting mechanisms of the unit is assigned a distinct weighted decimal value of a successive power of the number two. Thus, the first counting member represents $2^0$ power which is equivalent to the decimal value one, the second counting member represents $2^1$ power which is equivalent to the decimal value two, the third counting member represents $2^2$ power which is equivalent to the decimal value 4, the fourth counting member represents $2^3$ power which is equivalent to the decimal value 8, while the fifth counting member represents $2^4$ power which is equivalent to the decimal value 16.

The accumulator unit utilizes the 1, 2, 4, and 8 binary counting members to achieve a 4 place binary counter with the 16's binary counting member being utilized as a carry indicator. In a 4 place binary counter, it is possible to represent any one of the decimal values from 1 to 15 by inserting a binary one in the correct binary place or column position. Thus, a decimal value 7 is represented in the counter by inserting a binary one in the 4, 2, and 1 binary place positions, while a decimal value of 15 is represented by inserting a binary one in each of the 8, 4, 2, and 1 binary place positions.

The binary equivalents of the decimal numbers 1 to 9 are entered into each counter through the medium of perforated records. The record cards contain parallel columns of vertically extending data indicating areas which are divided into index points, each of the latter being representative of one of the binary code values 8, 4, 2, or 1. Thus, the number seven is represented in the desired column of the record, in a binary coded form, by perforating the 4, 2, and 1 index points of that column. The record cards are advanced 8's index point first through a sensing station thus effecting serial entry of the binary coded decimal digits into the related counters. For example, the sensing of the perforations in the 4, 2, and 1 index points of a column perforated to represent the number 7, effects the entry of a binary one into first the 4, then the 2, and finally the 1 binary place positions of the related counter. As stated previously, the counter itself accumulates in a binary fashion. Thus, if a decimal three is represented in a counter by a binary one in the 2 and 1 binary place positions and a binary zero in the 8 and 4 binary place positions, the entry of another three into the counter results in the counter representing the total of six by a binary one in the 4 and 2 binary place positions and a binary zero in the 8 and 1 binary place positions.

If a binary one is entered into a counter which already has a 15 registered therein, the 8, 4, 2, and 1 binary counting members are restored to their binary zero indicating positions while a binary one is set up in the 16's binary counting member. It is, therefore, evident that the binary designation of 15 in the counter corresponds to the nine designation in a decimal system counter since the addition of 1 to either counter clears the counter and effects a carry operation. Although the subject counter functions on a 16 digit basis rather than a 10 digit basis as in a straight decimal counter, an automatic entry of +6 into the counter after the regular counter entry interval, may be utilized to exhaust the 6 extra counting positions of the counter and thus equate the counter to a decimal basis. By this action, the 16's carry of the counter becomes the equivalent of a 10's carry in a decimal counter.

For example, if the sum digit represented in the counter after the counter entry operation is greater than 9, the additional of the supplemental +6 thereto forces a carry into the 16's binary counting position. This binary carry is utilized to effect the entry of a decimal carry to the next higher order counter unit. If after the decimal carry is effected, the 16's binary counting member is restored to a position representative of a binary zero, the number represented in that counter will be arithmetically correct since in effect +6 was added to the counter, −16 was taken away from the counter, thus leaving the counter with 10 less than its original value. This, of course, is the desired result since a tens carry was effected into the next higher order counter.

If the sum digit represented in the counter is less than 10 after the counter entry operation, the addition of the supplemental +6 thereto does not effect a carry into the 16's binary counting position. This signifies that the sum digit was less than 10, however, the sum digit is now too large by +6. The counter may be restored to its original value by adding +10 thereto and ignoring the carry into the 16's binary counting position. Since the counter operates on 16 digit basis, the addition of the +6 supplement and the later entry of the +10 correction or +16 in all, in effect, "rolls" the counter through a complete cycle and back to its original amount, provided the 16's carry is prevented.

The entry of the +6 supplemental value to the counter and the entry of the +10 correction factor thereto, when required, is controlled through a novel arrangement of mechanically operated contacts which are integral with the counter. Subtraction is effected in the counter by complementing and by the entry of the +6 supplement and the +10 correction factor when required.

An object of the invention is to provide an electro-mechanical counter unit which accumulates on a binary number basis and yet effects a carry operation, when required, on a decimal number basis.

Another object of the invention is to provide an electro-mechanical counter unit which accumulates single order decimal digits in binary coded form in a serial fashion, binary code position, by binary code position.

Another object of the invention is to provide an electro-mechanical counter unit having a plurality of counting members interconnected in such a manner so as to accumulate on a binary number basis, each counter member being assigned a specific weighted value of a power of the number two.

Another object of the invention is to provide an electro-mechanical counter unit which accumulates on a binary number basis and carries on a decimal number basis and may be cascaded with similar units to form a multi-order accumulating machine.

Another object of the invention is to provide an electro-mechanical counter of sufficient capacity to accumulate any decimal sum digit from 0 to 15 in binary coded form and including a 16's carry indication, wherein the counter is rendered equivalent to a conventional decimal counter with 10's carry indication by the automatic entry of various correction factors, as required, the entry of these latter values being under the control of a novel arrangement of mechanically operated contact points integral with and controlled by the counter itself.

Other objects of the invention will be pointed out in the following description and claims and illustrated in the accompanying drawings, which disclose, by way of example, the principle of operation and the best mode, which has been contemplated of applying that principle.

In the drawings:

Fig. 4 is a vertical section view of the counter unit taken on the plane of the line 4—4 of Fig. 1 and shows, in particular, the "4" binary readout arm and its associated switch mechanism.

Fig. 5 is a projection view of the "4" binary readout arm and its associated control cam.

Figure 13A:
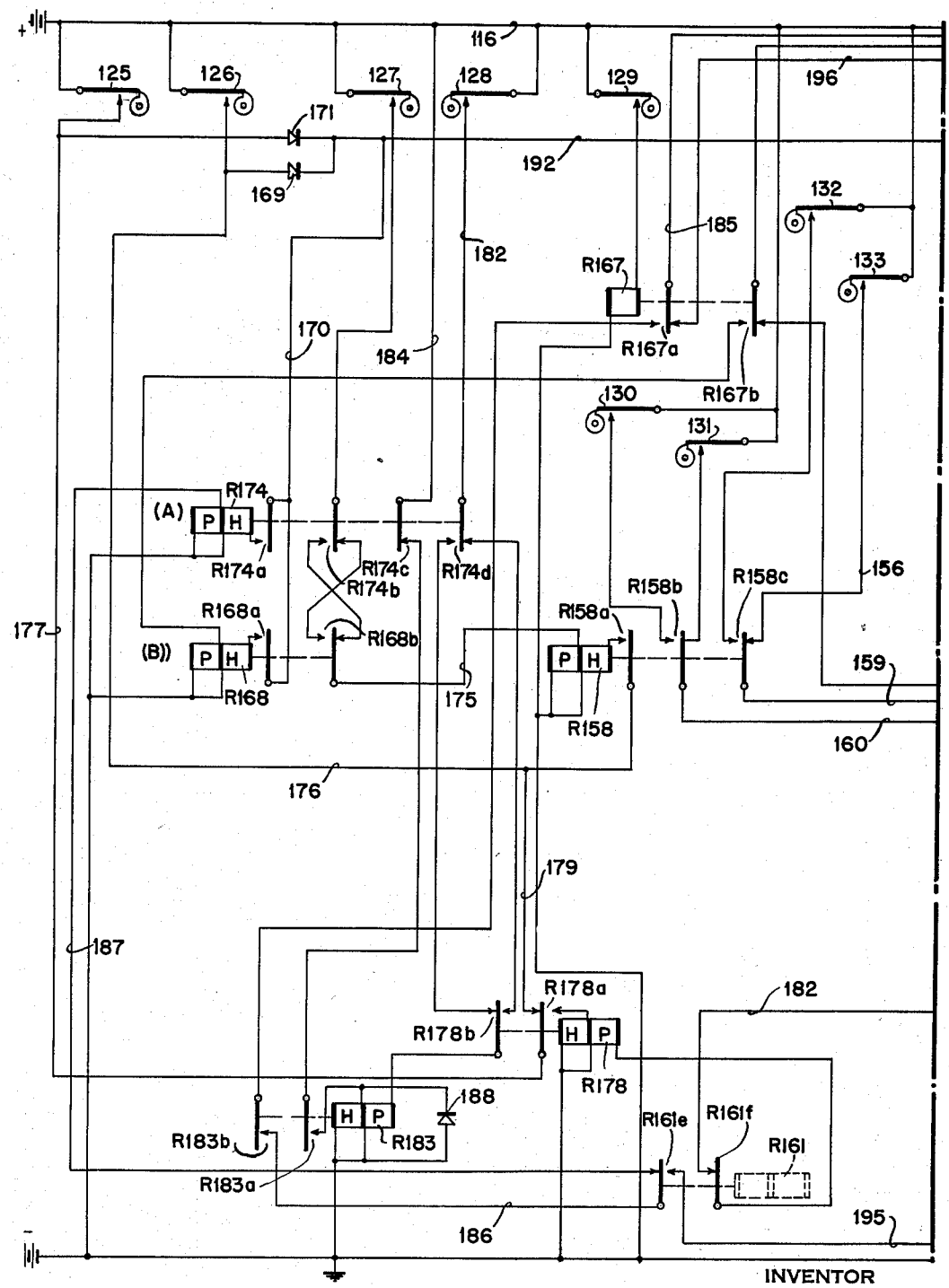
Figure 13B:
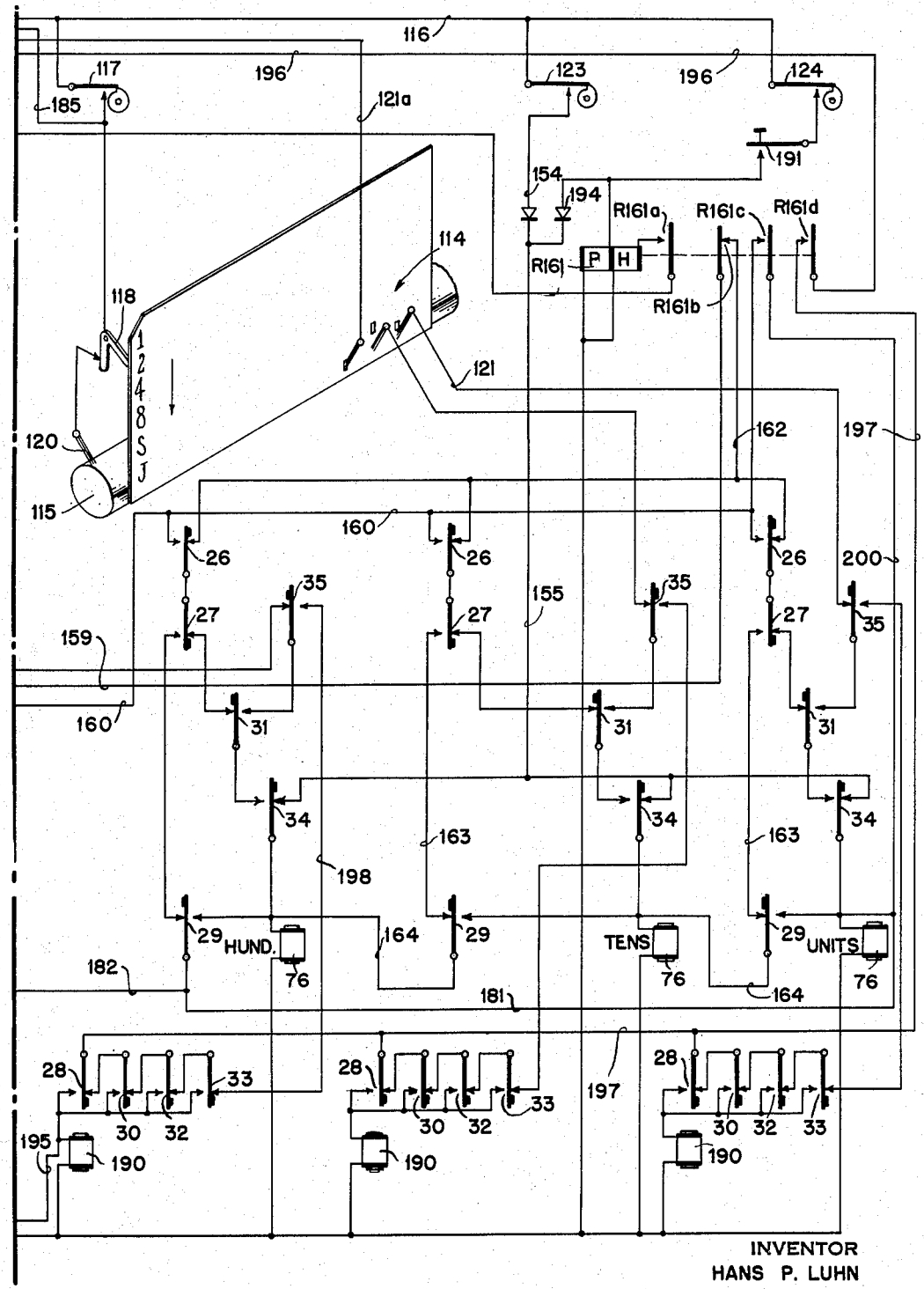

Figs. 13A and 13B comprise diagrammatic circuit representation of three of the counter units connected in cascade so as to form a three order accumulating machine.

Figure 14A:
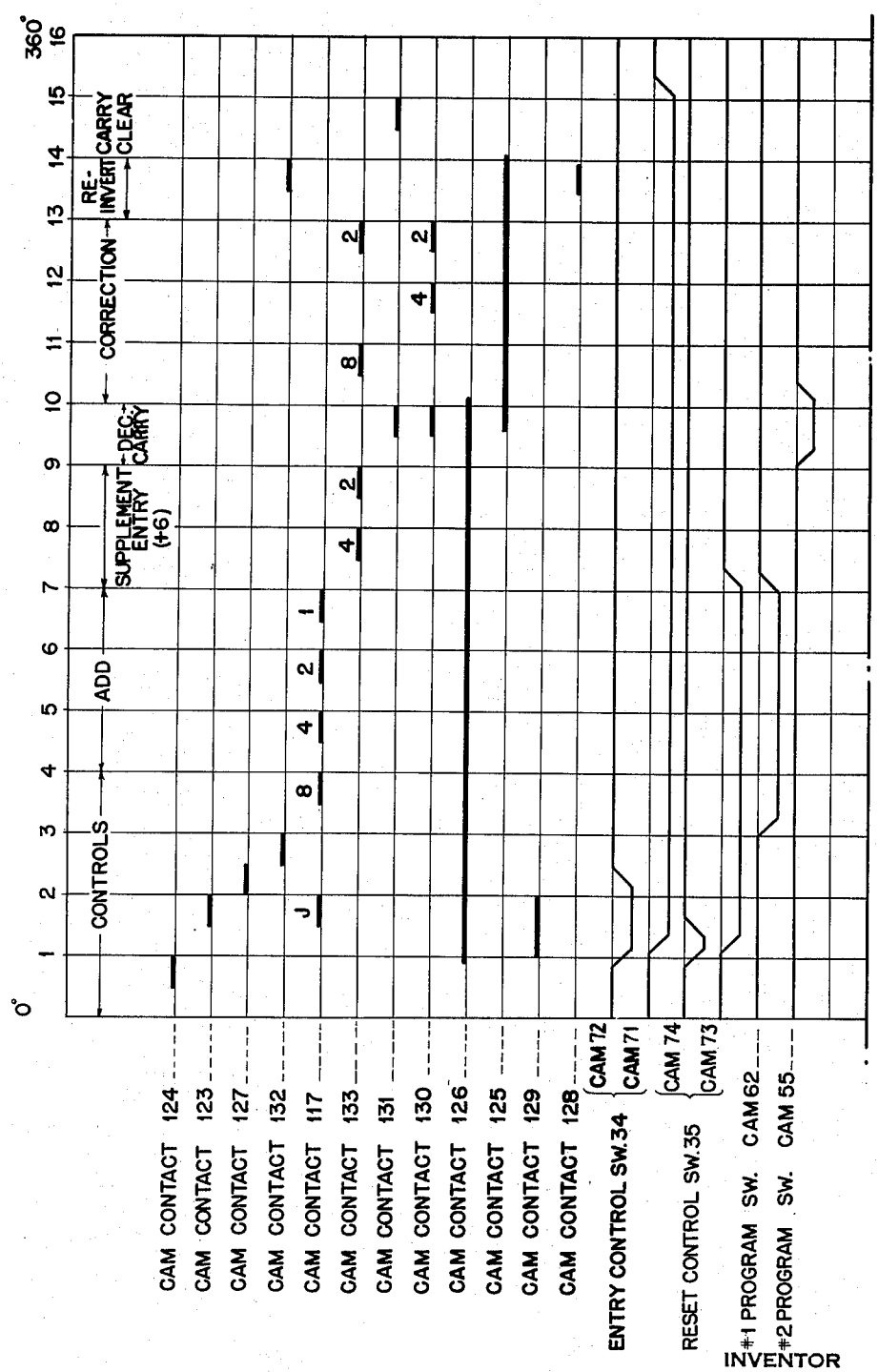
Figure 14B:
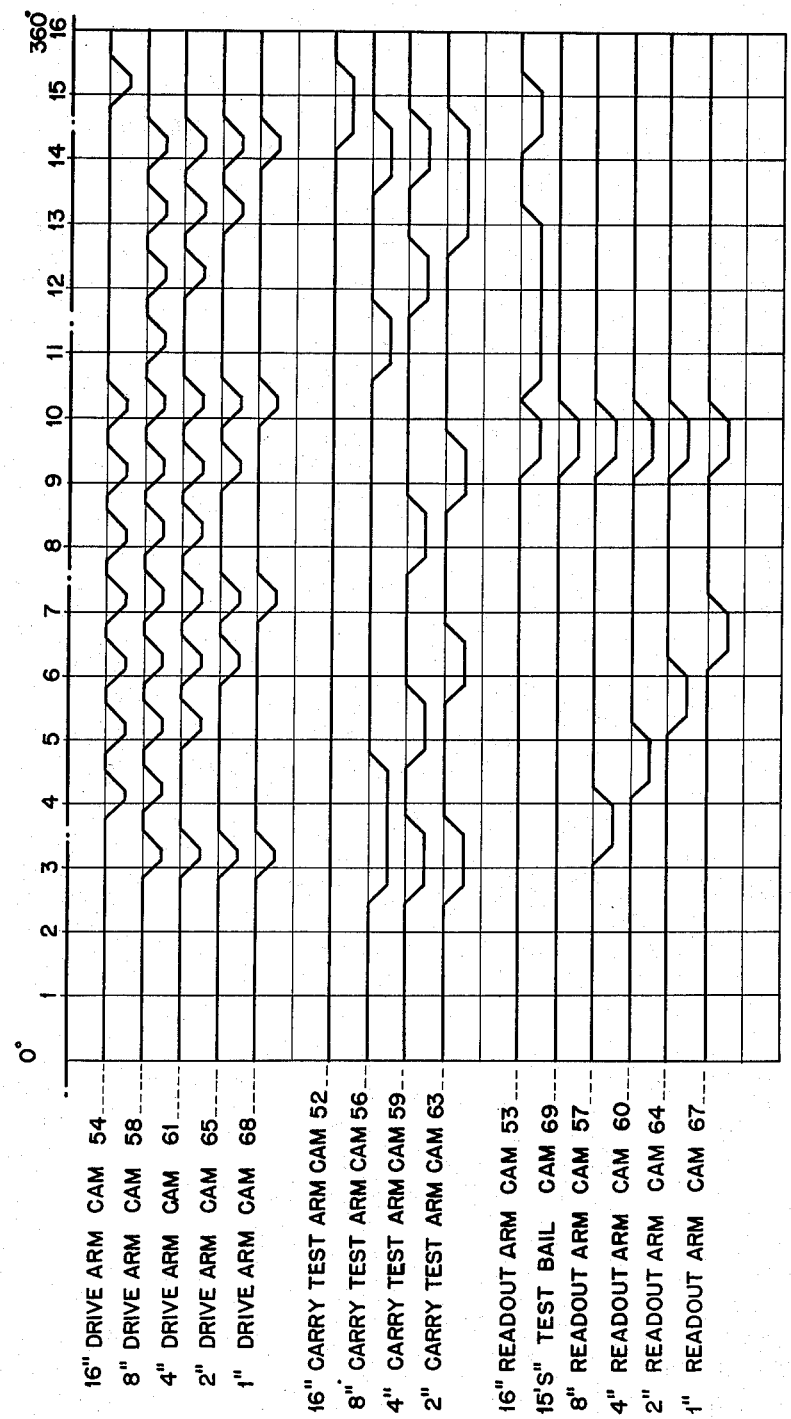

Figs. 14A and 14B are a mechanical and electrical timing chart.

Figure 1:
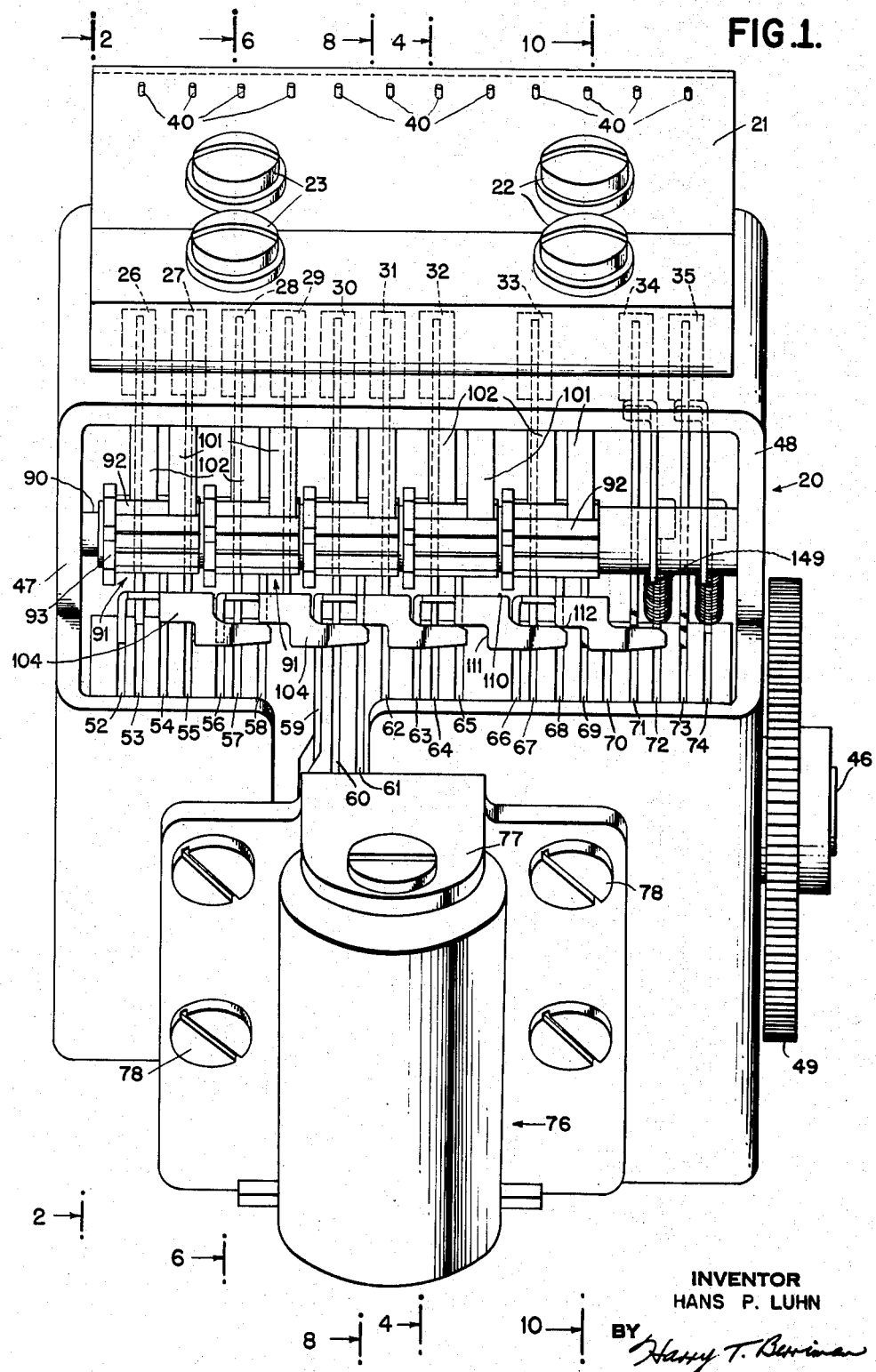
Fig. 1 is a front elevational view of the binary-decimal counter unit.
Figure 2:
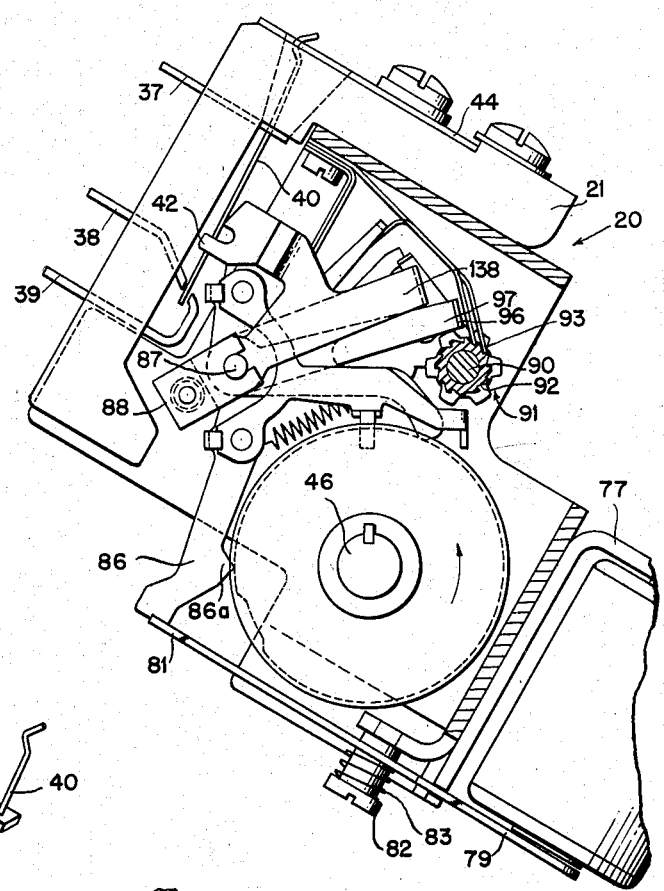
Fig. 2 is a vertical section view of the binary-decimal counter unit taken on the plane of the line 2—2 of Fig. 1 and shows, in particular, the carry 15 test bail and its associated operating mechanism.

Referring to Figs. 1 and 2, the binary-decimal counter unit comprises a metal frame member 20 having an L-shaped insulating moulding 21 secured thereto by means of screws 22. Carried by the moulding 21 are ten identical single pole double throw switches labeled 25 to 35. Each switch comprises three stationary contact members 37, 38 and 39, and a spring wire transfer member 40. The contact members are imbedded in the moulding with their outer ends extending outwardly beyond the moulding, as indicated, in order that electrical connection may be made thereto. The transfer member 40 extends through and continually engages the contact 37 and has its one end extending between the inner ends of the related contact members 38 and 39. It will be noted that the transfer member extends through an insulation member 42. The member 42 is secured to a related switch operating mechanism and with this mechanism in its normal or inoperative position, the member 42 is positioned so as to engage the transfer member 40 with contact member 38, thus completing a circuit from the contact member 37 to the contact member 38. When the associated switch mechanism is rendered operative, in a manner to be later explained, the spring wire member 40 is transferred so as to complete a circuit from the contact member 37 to the contact member 39.

It will be noted in Figs. 1 and 4 that the transfer member 40 of each switch extends through an opening 43 in the moulding 21 and finally terminates with a hooked end thereof engaging an aligned opening in a mica plate 44. The plate is common to the transfer members of all ten switches of the counter unit and is normally clamped to the moulding by the screws 22. By loosening the screws 22 slightly, the plate 44 may be shifted relative to the moulding 21 to effect an adjustment of the lateral displacement of the hooked ends of the members 40 relative to their fixed support points on the related contact members 37. In this manner, the spring tension of the members 40 may be controlled as desired.

Extending across the entire counter unit is a drive shaft 46 which is journalled in the side portions 47 and 48 of the frame 20. The shaft 46 extends beyond the side portion 48 of the frame and secured to this extending portion is a gear 49 which is operatively linked to any suitable driving means (not shown) so that the shaft 46 is continuously rotated counterclockwise in Fig. 2. A complete revolution of the shaft 46 is required to effect one complete cycle of operation of the counter. The counter cycle is broken up into 16 equal increments, each increment being equal to 22.5° of angular rotation of the shaft 46. For ease of explanation, these increments will be referred to as cycle points, thus cycle point number 1 extends from 0° to 22.5° of angular displacement of the shaft 46 from its home in 0° position, cycle point number 2 extends from 22.5° to 45° of angular displacement of the shaft 46 from its home position, and so forth as indicated in Fig. 14.

Keyed to the shaft 46 for rotation therewith are cams designated 52 to 73 which contain various operational notches as indicated in Fig. 14. The cams 52 to 73 in conjunction with a single electromagnet 76 control the operation of the counter unit. The electromagnet 76 is secured to a yoke 77 which in turn is secured to the front portion of the frame by screws 78. An armature 79 of the magnet extends through and is pivotally supported by the yoke 77, as indicated in Fig. 2. The outer end of the armature contains a flared portion 81 which extends across the majority of the counter unit. Extending loosely through a suitable opening in the armature 79 is a fastening 82 which is screwed to an underlip of the frame 20. A spring 83 surrounding the fastening and bearing against the head thereof and the one face of the armature, normally biases the armature 79 clear of the magnet core 84.

With the armature in this latter position, its flared end 81 is adapted to engage the notched end of various drive arms (such as 86 in Fig. 2) so as to prevent follower portions 86A thereof from engaging the operational notches in their related cams. The arms (such as 86) and other allied mechanism to be later explained, are pivotally mounted on a shaft 87 carried by a comb-like support member 88. The member 88 extends across the entire counter unit and is secured at its ends to the side portions 47 and 48 of the frame 20. The comb-like recesses in the member 88 prevent lateral shifting of the arms and allied mechanism on the shaft 87.

Extending parallel to the shaft 87 is a second shaft 90 which is rigidly supported at its ends in the side portions 47 and 48 of the frame. Rotatably mounted on the shaft 90 are five so-called binary counting wheels 91 which are arranged adjacent each other as best indicated in Fig. 1. Each of these counting members 91 comprises two parts, a 12 toothed spline 92 and a six lobed member 93 which is rigidly secured to the one end of the spline as indicated. Each of the counting wheels is assigned a weighted value of a successive power of the number two, preceding from right to left in Fig. 1. Thus, the extreme right hand wheel 91 represents $2^0$ power or "1," the next wheel to the left thereof represents $2^1$ power or "2," the next wheel represents $2^2$ power or "4," the next wheel represents $2^3$ power or "8," while the extreme left hand wheel represents $2^4$ power or "16." Each of the counting wheels is adapted to indicate either a binary one or a binary zero dependent upon its angular position on the shaft 90. A counting wheel 91 indicates a binary one when it is angularly positioned on the shaft 90 so that one of its lobes 93A is aligned with an extending ear 96 (see Fig. 5) of a related binary readout arm 94. Conversely, a counting wheel indicates or registers a binary zero when it is angularly positioned on the shaft 90 so that a low dwell 98 of the six lobed portion 93 is aligned with the ear 96 of the related readout arm 97. Thus, the binary counting wheel 91 shown in Figs. 2, 4 and 5 is positioned in a binary zero indicating position.

When a counting wheel is positioned so as to indicate a binary one, it represents the particular decimal code value of the power of the number two which was assigned to that particular counting member. Thus, the decimal value seven is represented in the counter by registering a binary one in the $2^2$ power or "4," the $2^1$ power or "2," and the $2^0$ power or "1" counting wheels. By utilizing only the "8," "4," "2," and "1" binary counting wheels as actual indicating positions, it is possible to represent any one of the decimal digits 0 to 15. This is effected by registering a binary one, singly or in combination, in the various binary wheels or binary place positions as indicated symbolically in the following table.

*Binary representation*

| Decimal Valve | Binary Counting Wheels or Place Position | | | | |
|---|---|---|---|---|---|
| | "16" ($2^4$) | "8" ($2^3$) | "4" ($2^2$) | "2" ($2^1$) | "1" ($2^0$) |
| 0 | | 0 | 0 | 0 | 0 |
| 1 | | 0 | 0 | 0 | 1 |
| 2 | | 0 | 0 | 1 | 0 |
| 3 | | 0 | 0 | 1 | 1 |
| 4 | | 0 | 1 | 0 | 0 |
| 5 | | 0 | 1 | 0 | 1 |
| 6 | | 0 | 1 | 1 | 0 |
| 7 | | 0 | 1 | 1 | 1 |
| 8 | | 1 | 0 | 0 | 0 |
| 9 | | 1 | 0 | 0 | 1 |
| 10 | | 1 | 0 | 1 | 0 |
| 11 | | 1 | 0 | 1 | 1 |
| 12 | | 1 | 1 | 0 | 0 |
| 13 | | 1 | 1 | 0 | 1 |
| 14 | | 1 | 1 | 1 | 0 |
| 15 | | 1 | 1 | 1 | 1 |

The $2^4$ power counting member is utilized as a 16's carry indication when the capacity of the counter is exceeded. Thus, the decimal value 18 is represented by a 16's carry indication (a binary one registered therein) and a binary one in the "2" binary place position.

Accumulation is performed in the counter, binary place position by binary place position in accordance with the accumulation table shown below.

| Augend | 0 | 1 |
|---|---|---|
| | Sum | |
| Addend: | | |
| 0 | 0 | 1 |
| 1 | 1 | 0 |

In order to better illustrate the accumulation rules set forth in the above table, the procedure of the counter in accumulating 7+6 will be explained in symbolic form. The augend +7 and the addend +6 are indicated below in their binary coded form and the sum digit of 13, also indicated in binary coded form, is achieved in accordance with the rules represented in the above table in the following manner: Proceeding from left to right,

| | 16 | 8 | 4 | 2 | 1 |
|---|---|---|---|---|---|
| Augend +7 | | 0 | 1 | 1 | 1 |
| Addend +6 | | 0 | 1 | 1 | 0 |
| Intermediate Sum | | 0 | ┌─0 | ┌─0 | 1 |
| Carry | | 1─┘ | 1─┘ | ─┘ 0 | 0 |
| Final Sum | | 1 | 1 | 0 | 1 | binary place position by binary place position, the addition of a binary zero (addend) to a binary zero (augend) in the "8" binary place position gives an intermediate binary sum zero. In the "4" binary place position, the addition of a binary one (addend) to a binary one (augend) gives an intermediate binary zero sum and a binary one carry into the "8" binary place position. The binary one carry and the intermediate sum zero in the "8" position are then accumulated to give a final binary sum of one in that position. In the "2" binary place position, the addition of a binary one (addend) to the binary one (augend) gives an intermediate binary sum zero and a binary one carry into the "4" binary place position. The binary one carry and the intermediate sum zero in the "4" position are then accumulated to give a final binary sum of one in that position. In the "1" binary place position, the addition of the binary 1 augend and binary 0 addend, gives a binary one sum. The desired sum digit of 13 is then represented in binary coded form in the counter.

Figure 6:
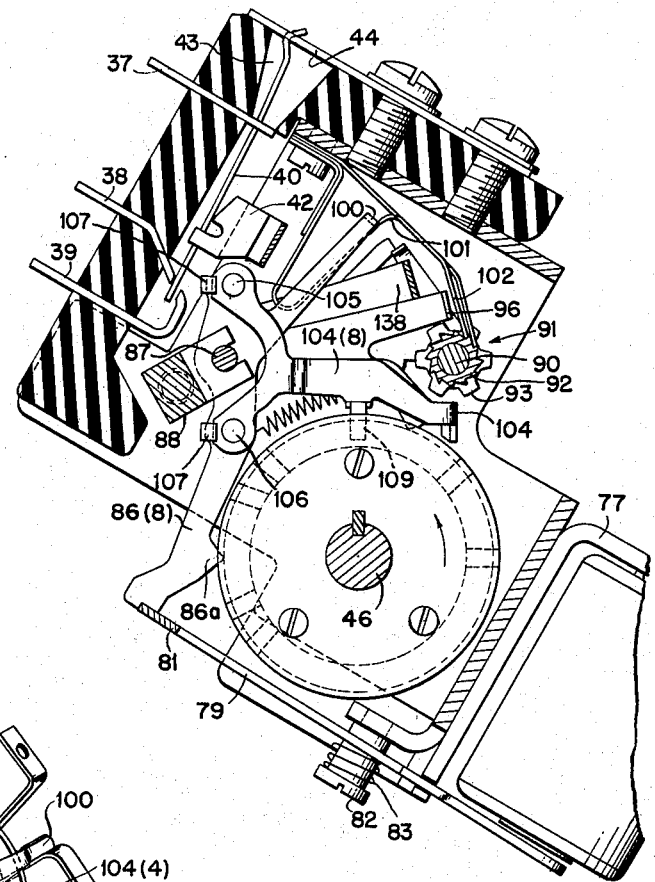
Fig. 6 is a vertical section view of the counter unit taken on the plane of the line 6—6 of Fig. 1 and shows, in particular, the $2^3$ power or "8" binary counting wheel and its associated operating mechanism.
Figure 7:
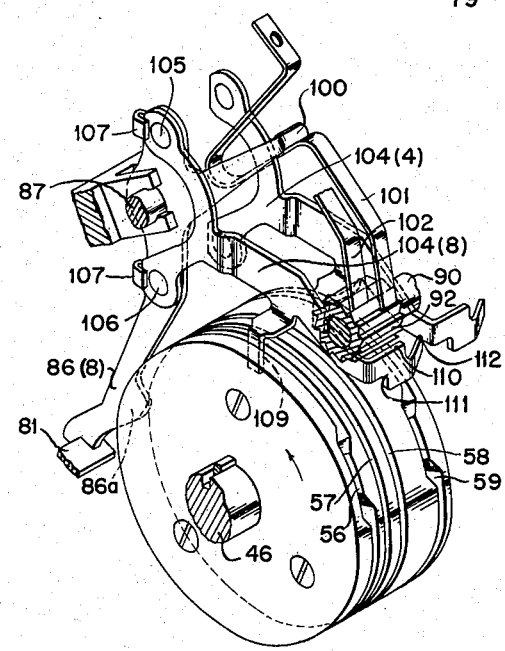
Fig. 7 is a projection view of the $2^3$ power or "8" binary counting wheel and its associated operating mechanism.

The actuating mechanism by which each of the binary counting wheels is positioned angularly on the shaft 90 so as to represent a binary one or zero during an accumulate operation, in accordance with the rules illustrated in the above table, is hereinafter explained. Referring to Figs. 6 and 7, there is shown the counter actuating mechanism for the "8" binary counting wheel 91. The mechanism comprises a related drive arm 86 ("8") which is pivotally mounted on the previously mentioned shaft 87. The drive arm includes a notched end which is adapted to latch on the flared end 81 of the armature when the magnet 76 is unenergized. The drive arm is continually biased counterclockwise in Fig. 7 by the engagement of a laterally extending ear 100 at the other end of the lever with a spring drive pawl 101. The spring drive pawl 101 is secured at one end to the frame 21 while its other end engages one of the teeth of the twelve toothed spline 92 of the "8" counting wheel 91. With the drive arm 86 in its latched position, a follower portion 86A thereof is maintained free of engagement with an associated cam 58.

When armature 79 is attracted upon the energization of magnet 76, the "8" drive arm 86 is unlatched. When a low dwell (see Fig. 14) of the cam 58 rotates into engagement with the follower portion 86A, the unlatched drive arm is rotated counterclockwise around the shaft 87 under the urging of the spring drive pawl 101 and, as a result the free end of the spring drive pawl is displaced counterclockwise one tooth position on the related twelve toothed spline 92. The next succeeding high portion of the cam 58 restores the drive arm 86 in a clockwise direction to once again be latched by the armature 79 of the then deenergized magnet 76. This latter motion is transferred to the associated spring drive pawl 101, thus stepping the corresponding twelve toothed spline clockwise one tooth position. A single tooth advance of the twelve toothed spline of the "8" counting wheel positions the associated six lobed member 93 so that if it was formerly registering a binary one, it will now be registering a binary zero, or vice versa. A spring detenting member 102 having one end secured to the frame 20 and the other end engaging the spline 92 prevents rotation of the binary counting wheel 91 in a counterclockwise direction.

There are similar actuating mechanisms associated with each of the remaining binary counting wheels, the drive arm for "16" binary counting wheel being adapted for cooperation with a related cam 54, and the drive arms for the "4," "2," and "1" binary counting wheels being adapted for cooperation with cams 61, 65, 68, respectively. The drive arms 86 of the "16," "4," "2" and "1" binary counting wheels are normally latched on the flared portion 81 of the common armature 79 in the same manner as previously explained for the "8" feed arm.

Associated with each of the five drive arms 86 of the counter is a so-called carry test arm 104 (see Figs. 1 and 7). It will be noted in Fig. 7 that each carry test arm is fixed to the related drive arm 86 for pivoted movement therewith by means of pins 105 and 106 carried by the drive arm. The carry test arm is movable on the pins 105 and 106 laterally relative to the drive arm, however, tab-like extensions 107 of the drive arm prevents lateral movement of the one end of the carry test arm so that, in effect, the carry test arm is hingedly mounted on the drive arm. Although each carry test arm is attached to its related drive arm for pivotal movement therewith, it is shifted laterally to the drive arm by the engagement of a cam follower extension 109 thereof with a related groove cam, such as the groove cam 56 in Fig. 7 for the "8" carry test arm. Similar groove cams 52, 59 and 63 are provided for the "16," "4," and "2" carry test arms, respectively. The cam follower portion of each carry test arm rides in the groove of its related cam and at each offset in the cam (see Fig. 14) effects an oscillation of the carry test arm. The carry test arm associated with the "1" feed arm is not oscillated laterally relative to its drive arm but always remains in the position indicated in Fig. 1. The reason for this difference of operation between the "16," "8," "4," and "2" carry test arms and the "1" carry test arm will be later evident.

In Fig. 1, each of the carry test arms 104 is shown in its normal position. With each arm in this latter position, it will be noted that the surface 110 of a laterally extending portion 111 of each test arm (with the exception of the "1" carry test arm) is positioned in the plane of the six lobed portion 93 of the adjacent lower binary order counting wheel 91. It will also be noted in Fig. 1 that a surface 112 of the extending portion 111 of each arm (with the exception of the "1" carry test arm) projects into the plane of the adjacent lower binary order test arm. The normal position of the carry test arms is shown in simplified form in Fig. 12. With a carry test arm in its normal position, the surface 110 thereof "tests" the preceding (lower order) binary counting wheel 91 to determine if a binary one is registered therein and the surface 112 "tests" the preceding carry test arm. If a binary zero is registered in the preceding binary counting wheel, the surface 110 abuts one of the six lobes of that member. As a result, the drive arm 86 is not free to rotate counterclockwise in Fig. 2 to effect a single step advance of the related binary counting wheel even though the armature 79 is attracted at that time and a low dwell of the related cam 54, 58, 61, 65 or 68 is adjacent the follower portion 86A. If a binary one entry exists in the preceding binary counting wheel 91, the surface 110 engages one of the low dwells of the six lobed member of the preceding binary counting wheel. As a result, the drive arm 86 is free to operate to advance its associated binary counting wheel one tooth position in the manner previously explained, provided, the preceding carry test arm and its associated drive arm are also able to move. It will be appreciated that the operation of the "1" drive arm is not limited in this manner since the associated carry test arm has no lower order counter wheel or carry test arm to "test."

Figure 12:
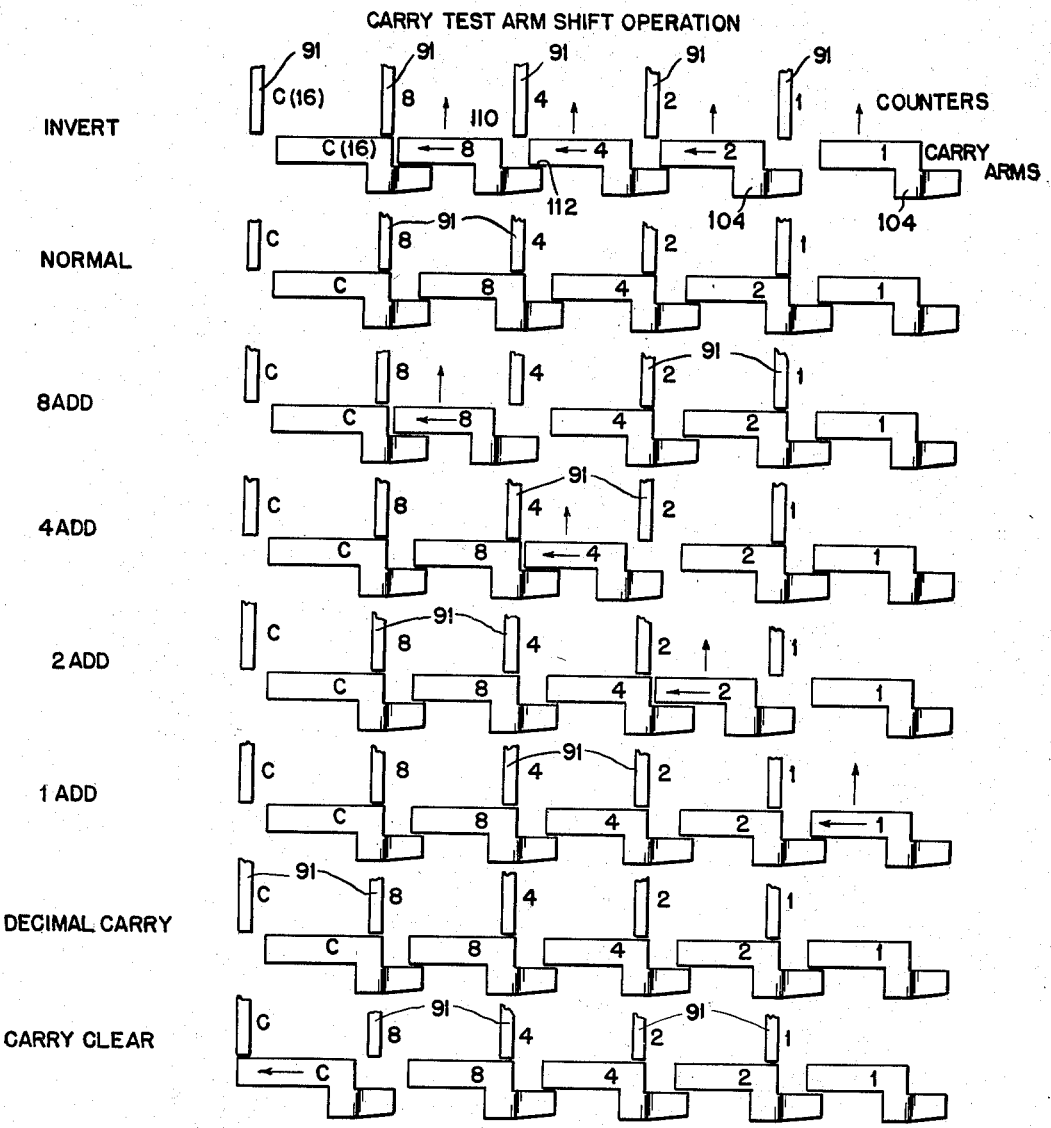
Fig. 12 is a diagrammatic representation of the operational positions of the various carry test arms of the counter unit during the various possible counter operations as designated at the left of the drawing.

When a carry test arm 104 is shifted to the left in Fig. 1 from its so-called normal position by the offset in the related groove cam, the surface 110 is moved clear of the plane of the preceding lower order binary counting wheel 91, and the surface 112 is moved clear of the preceding carry test arm. Each carry test arm, with the exception of the "1" carry test arm, is shifted during definite intervals of the machine cycle as indicated in Figs. 12 and 14. It will be appreciated that during the machine intervals when a carry test arm occupies its so-called shifted position, it places no restriction on the operation of the related drive arm. The manner in which the drive arms and their associated carry test arms properly effect accumulation, binary place by binary place position, will be best illustrated by tracing the operation of the counter during a representative accumulate operation, such as the previous example of 7+6=13.

Entry of the binary coded decimal digits into the counter is effected through the medium of perforated record cards. The record cards are rectangular in form and are divided into vertically extending ordinal columns and six equally spaced horizontally extending index points. The index points are designated JR8421 preceding from the bottom to the top of the record. The J index point is used for sign control while the R index point has no operational significance in this particular counter. A decimal number is designated in a record in binary coded form by suitable perforations in the desired column. Thus, the number 7 is represented by perforating the 4, 2, and 1 index points of the desired column. If the value 7 is a negative quantity, the J index point of that column is perforated also. A positive value is indicated by the absense of a perforation in the J index point of that column.

The record cards are advanced successively, J index point first between a line of sensing brushes 114 (Fig. 13B) and a contact roll 115, there being one brush for each column which it is desired to sense. Thus, the columns of the record are sensed simultaneously, index point position by index point. The records are advanced successively between the brushes and the contact roll 115 by suitable mechanism (not shown) which is operatively linked to and timed with the driving means for the counter. Thus, the J index point of a record is sensed during the latter part of the second cycle point of the counter cycle, while the R, 8, 4, 2, and 1 index points are sensed during the latter part of the third, fourth, fifth, sixth and seventh cycle points of the counter cycle, respectively, as indicated in Fig. 14. Upon the sensing of a perforation in a column of the record, the control magnet 76 of the corresponding counter is impulsed, the circuit extending from a power line 116, through a cam contact 117, a card lever contact 118, which is closed when a record is passing between the brushes and the contact roll, a common brush 120, the conductive roll 115, the sensing brush 114 and its associated conductor 121, and finally to the related control magnet 76. The cam contact 117 and similar contacts 123 to 133, are closed during specific intervals of the counter cycle, as indicated in Fig. 14, by related cams which are operatively linked to and timed with the drive shaft 46 in any suitable manner (not shown).

In our particular example of 7+6=13, it will be assumed that prior to the entry of the number 7 into the counter, the counter was reset to zero. As the "seven" card advances between the contact roll 115 and the brushes 114, the sensing of the "4" perforation during the latter part of the fifth cycle point effects a momentary impulsing of the control magnet 76 of the related counter unit. The energization of the magnet 76 unlatches the 16, 8, 4, 2, and 1 drive arms of the counter. At this time, low dwells in the cams 54, 58 and 61 are adjacent the follower portions 86A of the "16," "8," and "4" drive arms, however, reciprocation of the "16" and "8" drive arms is prevented since their related carry test arms are in their normal position and find binary zeros in the preceding counting members. The "4" drive arm is, however, reciprocated by its operational cam 61, since the associated "4" carry test arm is "shifted" at this time as indicated in Fig. 12 ("4" add time) and thus does not prevent movement of the drive arm. The reciprocation of the "4" drive arm effects a single tooth advance of the related "4" counting wheel thus advancing it from a binary zero to a binary one indicating position.

The sensing of the "2" perforation in the record during the latter part of the sixth cycle point, again impulses the control magnet 76 and unlatches the five drive arms. At this time low dwells in the cams 54, 58, 61 and 65 are adjacent the follower portion 86A of the "16," "8," "4," "2" drive arms, however, the only drive arm which is able to be reciprocated at this time is the "2" drive arm. It will be noted in Fig. 12 that the "2" carry arm is shifted at this time ("2" add time) with its surface 110 being clear of the plane of the "1" binary counting wheel, and its surface 112 being clear of the "1" carry test arm. Consequently, there is no impediment to the movement of the "2" drive arm 86. Reciprocation of the "16," "8," and "4" drive arms is prevented since their carry test arms are positioned in their normal position, the "4" carry test arm finding a binary zero in the "2" binary counting wheel at the beginning of "2" add time, while the "16" carry test arm finds a binary zero in the "8" binary counting wheel, and the "8" carry test arm, even though it finds a binary one in the "4" binary counting member, being blocked against movement by the engagement of its surface 112 with the "4" carry test arm. The reciprocation of the "2" drive arm effects a single tooth advance of the related "2" counting wheel thus advancing it from a binary zero to a binary one indicating position.

The sensing of the "1" perforation in the record during the latter part of the seventh cycle point, again impulses the control magnet 76 and unlatches the 5 drive arms. At this time, low dwells in the cams 54, 58, 61, 65, and 68 are adjacent the follower portions 86A of the associated "16," "8," "4," "2," and "1" drive arms, however, the only drive arm which is able to be reciprocated at this time is the "1" drive arm. Since the "1" carry test arm has nothing to prevent its movement, there is no impediment to the reciprocation of the "1" drive arm. Reciprocation of all of the higher binary order arms above the "1" drive arm is prevented as will be evident from an examination of Fig. 12 ("1" add time). It will be noted that the "16," "8," "4," "2" carry test arms occupy their normal position at this time. Movement of the "2" test arm is prevented since it finds a binary zero in the "1" binary counting wheel at the beginning of "1" add time. With the "2" test arm blocked against movement and each succeeding higher order carry test arm having its surface 112 abutting the preceding lower order carry test arm, movement of the "16," "8," and "4" drive arms is prevented also. The reciprocation of the "1" drive arm effects a single tooth advance of the associated "1" binary counting wheel thus advancing it from a binary zero to a binary one indicating position.

As a result of the above described operations, a binary one has been registered in the "4," "2," and "1" binary counting wheels at the end of the card entry portion of the counter cycle and, therefore, the desired decimal value of seven has been entered into the counter in binary coded form. Various other operations are effected during the remaining cycle points of this counter cycle but since the net effect of these operations, in this particular instance, is that the counter again registers 7 in binary coded form at the end of the cycle, these operations will be ignored at this time.

The second record card is perforated in binary coded form to represent the decimal value six so that the sensing of the "4" perforation during the latter part of the fifth cycle point of the second counter cycle, effects a momentary impulsing of the control magnet 76 of the related counter unit. The energization of the magnet 76 unlatches the "16," "8," "4," "2" and "1" drive arms of the counter. At this time, operational notches in the cams 54, 58, and 61 are adjacent the follower portion 86A of the "16," "8" and "4" drive arms 86, however, only the "8" and the "4" drive arms are reciprocated. The "4" drive arm is able to be reciprocated since the associated "4" test arm is shifted at 4 add time as indicated in Fig. 12. The 8 drive arm is also able to be reciprocated even though its carry test arm is in its normal position, since it finds a binary one in the "4" binary counting wheel at the beginning of "4" add time. The engagement of the surface 112 of the "8" carry test arm with the "4" carry test arm does not prevent movement of the "8" drive arm, since the "4" drive arm and the associated carry test arm are reciprocated at the same time. The "16" drive arm is unable to move because its associated carry test arm is positioned in its normal position and finds a binary zero in the "8" counting wheel at the beginning of "4" add time. The operation of the 4 drive arm advances the related counting wheel a single tooth position and since it was previously registering a binary "1," it is advanced to a binary zero position. The operation of the 8 drive arm registers a binary 1 in the associated "8" counting wheel since it was previously registering a binary zero.

The sensing of the "2" perforation in the second record card during the latter part of the sixth cycle point again effects a momentary impulsing of the control magnet 76 of the counter unit. As a result, the "16," "8," "4," "2," and "1" feed arms of the counter are again unlatched. At this time, operational notches in the cams 54, 58, 61 and 65 are adjacent the follower portion of the "16," "8," "4," and "2" drive arms, however, only the "4" and the "2" drive are free to be reciprocated. The "2" carry arm is shifted as indicated (2 add time) in Fig. 12 so that there is no impediment to the movement of the 2 drive arm. The "4" carry arm is positioned in its normal position, however, since it finds a binary one in the "2" counting wheel at the beginning of "2" add time, movement of the associated "4" drive arm is permitted. The "8" carry test arm is positioned in its normal position at 2 add time and since it finds a binary zero in the "4" binary counting member, movement of the "8" drive arm is prevented. With movement of the "8" drive arm and its associated carry arm prevented, movement of the 16 drive arm is prevented by the engagement of the surface 112 of its associated carry test arm with the "8" carry test arm. The reciprocation of the "2" drive arm advances the associated "2" counting wheel to a position indicative of a binary zero since it was previously registering a binary one. The reciprocation of the "4" drive arm advances the associated "4" counting wheel to a position indicative of a binary one since it was previously registering a binary zero.

As a result of the above operations, the counter at the end of the card entry portion of the second counter cycle has a binary one registered in the "8," "4," and "1" binary counting wheels and, therefore, the desired sum digit 13 in binary coded form has been obtained. Various other operations are effected during the remaining cycle points of this counter cycle but these operations will be ignored at this time.

Serial readout of the counter is effected, binary place position by binary place position, through the medium of the previously mentioned binary readout arms 97. There are five binary readout arms in all, one for each binary counting wheel. Referring to Figs. 4 and 5, there is shown the binary readout arm 97 ("2") associated with the "2" binary counting wheel 91. The arm is pivotally mounted on the shaft 87 and includes a forked end, the lower branch 135 of the forked end engaging the cam 64. The upper branch 136 of the forked end of the arm 97 includes the previously mentioned laterally extending ear 96 which projects into the plane of the 6 lobed member 93 of the "2" binary counting wheel. Fixed to the other end of the arm 97 is a related insulation member 42 which is operatively connected to the transfer member 40 of the previously mentioned related switch 32. The spring tension of the transfer member 40 continually biases the readout arm clockwise in Figs. 4 and 5 so as to maintain the follower portion 135 in contact with the cam 64. The cam 64 contains two operational notches or low dwells as indicated in Figs. 4, 5 and 14, the first low dwell being engaged by the follower portion 135 of the arm during the latter part of the sixth cycle point and the second low dwell being engaged by the follower portion during the tenth cycle point. When the follower 135 of the arm is engaging the high dwell portion of the cam 64, the arm is angularly positioned on the shaft 87 so that the transfer member 40 is contacting the related contact 38. When a low dwell of the cam is sensed, the arm is rotated in a clockwise direction on the shaft 87 by the tension of the transfer member. As the arm 97 rotates the ear 96 checks the six lobed member 93 to determine if a binary one or a binary zero is registered therein. If a low dwell is sensed signifying the presense of a binary one in the counter wheel, the arm 97 is permitted to rotate clockwise sufficiently so that the transfer member shifts and engages contact member 39. If the ear engages one of the lobes of the member 93, clockwise movement of the arm 97 is arrested so that the member 40 remains engaging the contact member 38. When the member 40 is permitted to transfer to engage contact member 39 as the result of a "sensing" of a binary one in the related counting wheel, a suitable readout circuit is prepared as will be later evident.

There are similar readout arms provided for the "16," "8," "4," and "1" binary counting wheels; the "16" binary readout arm being operated by the associated cam 53 and serving to control the switch 26, the "8" binary readout arm being operated by the associated cam 57 and serving to control the switch 28, the "4" binary readout arm being operated by the associated cam 60 and serving to control the switch 30, and the "1" binary readout arm being operated by the associated cam 67 and serving to control the switch 33. It will be noted in Fig. 14 that the first low dwells in the cams 57, 60, 64 and 67 are encountered serially, in respect to counter cycle points, by the follower portions of their binary readout arms. As a result, readout of the 8, 4, 2 and 1 binary counting wheels is effected serially in the same sequence in which entry is effected into the counter.

Figure 3:
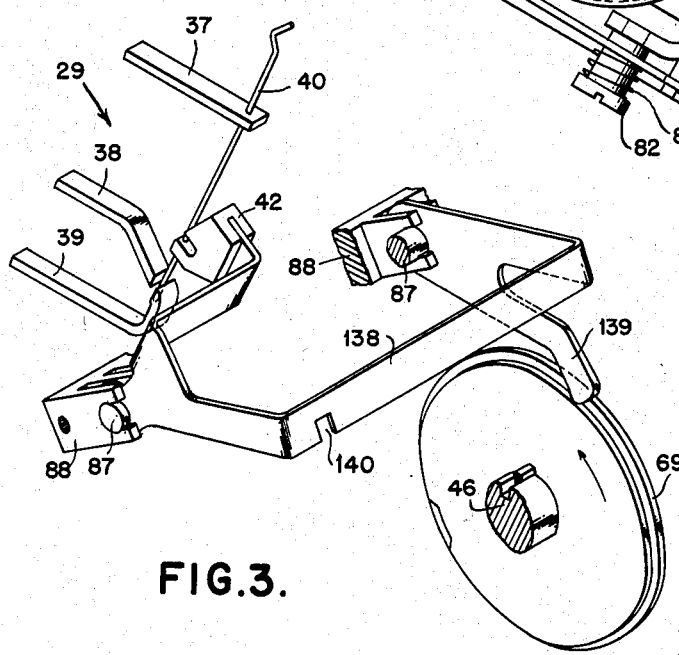
Fig. 3 is a projection view of the carry 15 test bail and its associated control cam.

Referring to Figs. 2, 3 and 5, it will be noted that extending transversely across the upper fork portions 136 of the 5 binary readout arms is a so-called 15's test bail 138. The bail 138 is pivotally mounted on the shaft 87, as best indicated in Fig. 3, and includes a follower portion 139 at one end which is adapted to cooperate with the cam 69. The other end of the bail is operatively linked to the spring transfer member 40 of switch 29. The transfer member 40 biases the bail clockwise on the shaft 87 in Fig. 2 and serves to maintain it in contact with the "8," "4," "2," and "1" binary readout arms 97. There is no contact between the "16" readout arm 97 and 15's bail 138 as a result of a recess 140 in the bail.

During the latter part of the tenth cycle point of the counter cycle, low dwells in the cams 57, 60, 64 and 67 are simultaneously engaged by the follower portion 135 of each of the "8," "4," "2," and "1" readout arms 97. At the same time a low dwell in the cam 69 is adjacent the follower portion 139 of the 15's test bail 138. If at this time there is binary one registered in each of the "8," "4," "2," and "1" counting wheels, which in the binary representation for 15, the simultaneous clockwise rocking of the four readout arms permits the bail 138 to be rocked clockwise under the urging of its associated transfer member 40. With a low dwell of the cam 69 adjacent the follower portion 139 of the 15's bail, the bail continues to rock clockwise until the transfer member 40 engages the contact member 39. This latter action prepares a so-called carry 15's test circuit in a manner to be later explained. The 15's test circuit is the equivalent of a 9's extend carry circuit in a decimal counter since a carry into that order counter not only effects a carry operation in the counter but extends the carry through the carry 15 test circuit to the next higher order counter.

Figure 8:
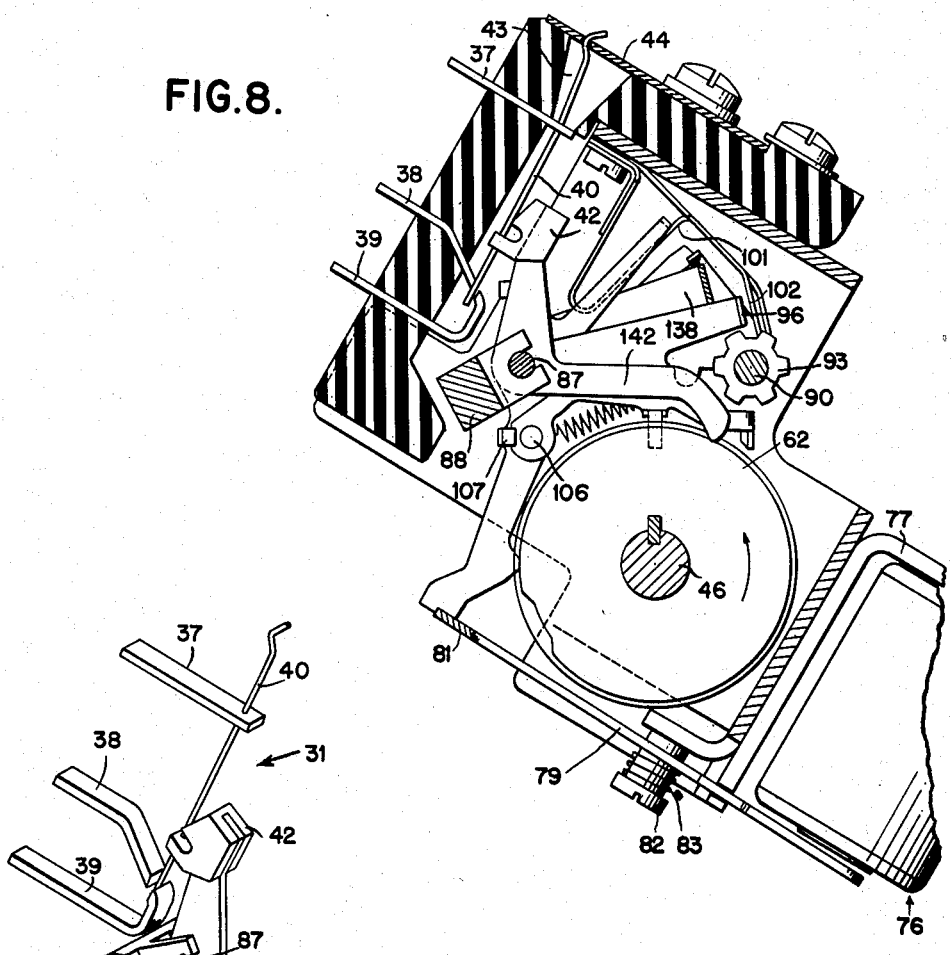
Fig. 8 is a vertical section view of the counter unit taken on the plane of the line 8—8 of Fig. 1 and shows, in particular, the number 1 program switch and its associated operating mechanism.
Figure 9:
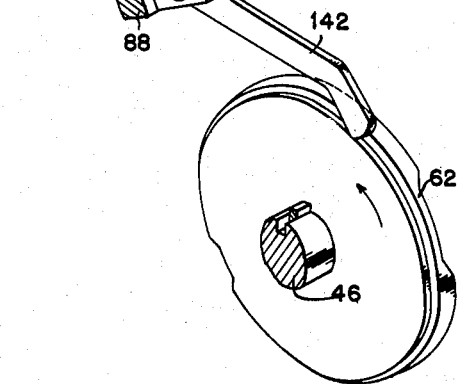
Fig. 9 is a projection view of the number 1 program switch and its associated control cam.

Referring to Figs. 8 and 9, there is shown the operating mechanism for switch 31 which is also referred to as program contact number 1. The mechanism comprises a follower 142 which is pivotally mounted on shaft 87 and is adapted for cooperation with the cam 62. The follower 142 is continually biased clockwise in Fig. 8 by a spring transfer member 40 of the switch 31 and, as a result, continually engages the cam 62. When a low dwell in the cam moves adjacent the follower, the follower rotates clockwise on shaft 87 so that the member 40 transfers from contact member 38 to contact member 39. The transferring of member 40 completes a program circuit in a manner to be later explained. A similar mechanism operated by cam 55 is provided for the switch 27, which is also referred to as program contact number 2.

Figure 10:
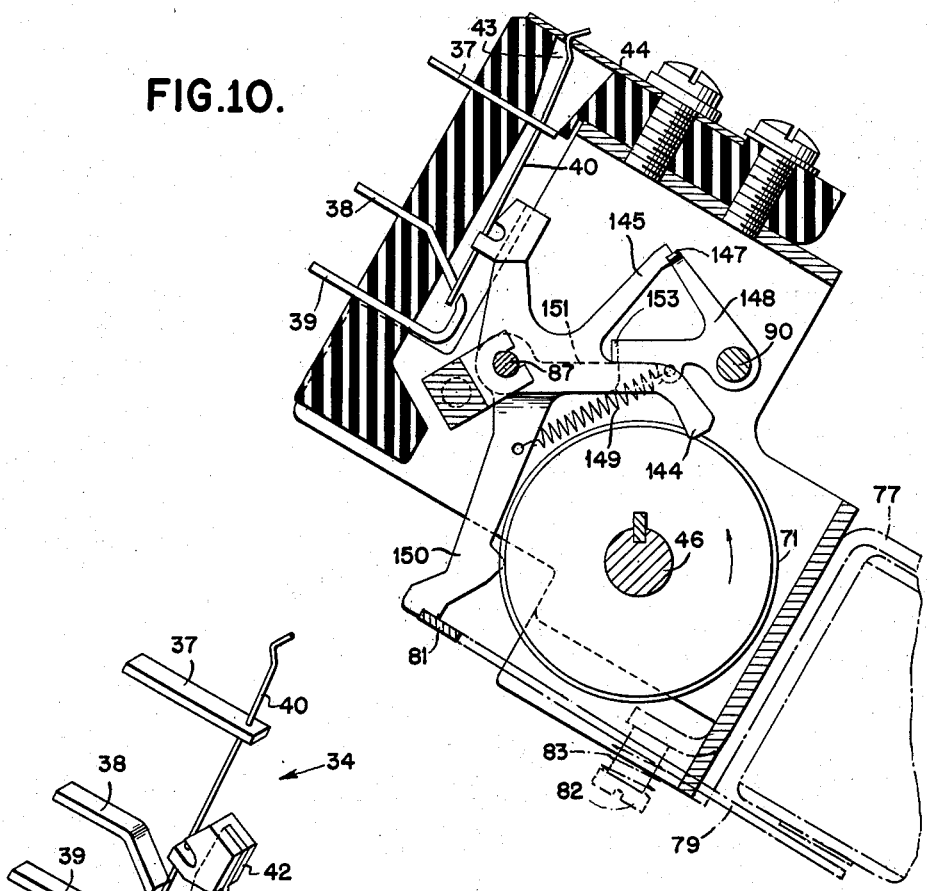
Fig. 10 is a vertical section view of the counter unit taken on the plane of the line 10—10 of Fig. 1 and shows, in particular, the entry control switch and its associated operating mechanisms.
Figure 11:
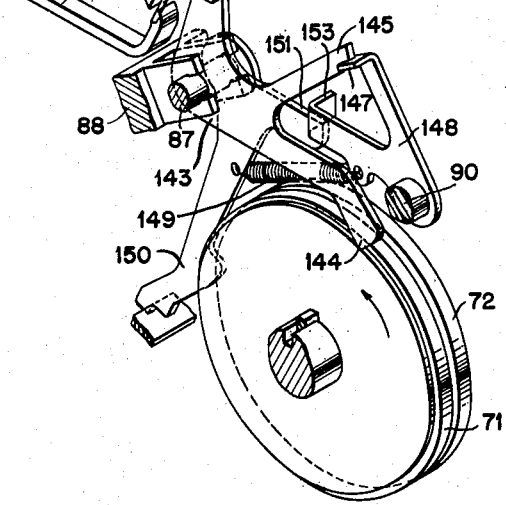
Fig. 11 is a projection view of the entry control switch and its associated operating mechanism and control cams.

Referring to Figs. 10 and 11, there is shown the operating mechanism for the so-called counter entry switch 34. The mechanism comprises a three armed lever 143 which is pivotally mounted on the shaft 87 and carries an insulation member 42 on its one arm by which it is operatively linked to an associated transfer member 40 of the switch 34. The second arm 144 of the lever 143 is adapted for cooperation with the previously mentioned cam 71. The third arm 145 of the lever is notched and is adapted to latch on an extending ear 147 of a latch member 148 when the member 148 is positioned as indicated in Figs. 10 and 11. The member 148 is pivotally mounted on the shaft 87 and is continually biased counterclockwise in Fig. 10 by a spring 149 connected between the member 148 and a follower 150. The follower is pivotally mounted on the shaft 87 and is adapted for cooperation with the cam 72 when the control magnet 76 is energized. The follower inclues a notched end portion which is adapted to latch on the flared end 81 of the armature 79 when the magnet 76 is unenergized. It will be noted that the follower 150 also includes an arm 151 which projects underneath a laterally extending ear 153 of the latch member 148. When the latch member is positioned so as to latch the lever 143 as indicated, the transfer member 40 of the related switch 34 is maintained engaging the related contact 38.

When the magnet 76 is impulsed, the movement of the armature 79 unlatches the follower 150. If a low dwell of the cam 72 is adjacent the follower at this time, the follower is free to rotate counterclockwise in Fig. 10 under the urging of the associated spring 149. As the follower rotates, its associated arm 151 engages the ear 153 of the latch member 148 and rotates the latch member clockwise on shaft 87 against the tension of spring 149. The rotation of latch member 148 unlatches the 3 armed lever 143 so that when a low dwell of the cam 71 moves adjacent the second arm 144 thereof, the lever 143 rotates clockwise in Fig. 10 under the urging of the spring tension of transfer member 40 of the switch 34. The lever 143 rotates until member 40 transfers thus connecting associated contact member 37 to contact 39. When a high dwell of the cam 72 engages the follower 150, the follower is restored clockwise and relatched on the armature of the then deenergized magnet 76. The restoration of the follower, however, does not effect the position of the three armed lever 143. When a high dwell of cam 71 engages the third arm 144 of the lever 143, the latter is restored counterclockwise on shaft 87 and the transfer member 40 restores to its original position engaging contact member 38. As the lever 143 restores counterclockwise, the ear 147 of the latch member drops off the end of the third arm 145 of the lever and the latch member restores counterclockwise on shaft 87 to relatch the lever 143 in the position indicated in Fig. 11.

It will be noted in Fig. 14 that the low dwell of the cam 72 is adjacent the follower 150 during the second cycle point, while the low dwell of the cam 71 is adjacent the arm 144 of lever 143 from the middle of the second cycle point to the middle to the beginning of the sixteenth cycle point of the cycle. As a result, if the magnet 76 is impulsed during the second cycle point, the switch 34 transfers from the position shown in Fig. 10 in the manner previously explained. The switch 34 remains transferred until the high dwell of cam 71 relatches the three armed lever 143 during the sixteenth cycle point of that cycle.

An operating mechanism identical to that shown in Figs. 10 and 11 except for the timing sequence is provided for the so-called reset entry switch 35. The cam 74 is adapted to operate the follower of this latter mechanism while the cam 73 is adapted to operate the associated 3 armed lever. Referring to Fig. 14, it will be noted that the low dwells in cams 73 and 74 are so arranged that if the magnet 76 is impulsed during the latter part of the first cycle point of the machine cycle, the switch 35 transfers and remains transferred until the beginning of the eighth cycle point. It will also be noted in Fig. 14 that the low dwells in cams 71, 72, 73 and 74 overlap to a sufficient extent so that the impulsing of the magnet 76 during the latter part of the first cycle point effects the transfer of both switch 34 and 35, while the impulsing of the magnet 76 during the latter part of second cycle point and not in the first cycle point, effects the transfer of only the switch 34. The purpose of this type of operation will be later evident in the description of the circuit operations.

Circuits

Referring to Figs. 13A and 13B, there is shown a diagrammatic circuit representation of three of the counter units connected in cascade so as to form a three order accumulating machine. The operation of the accumulating machine is best illustrated by tracing its operation through an actual accumulate operation. It will be assumed that the counters are reset to zero prior to the accumulate operation. The representative accumulate operation will involve the addition of 7 and 6 to give a sum of +13.

The value seven is represented in a first record card in binary coded form and this record card is sensed during the first machine cycle. The value six is represented in second record card in binary coded form and this record card is sensed during the successive machine cycle. The actual operation of the machine in effecting the sum 13 is represented diagrammatically below. The manner in which these counter operations are effected will now be explained in detail.

CYCLE #1
(Operation +7 to give sum of +7)

|  | Hundreds Order Counter | Tens Order Counter | Units Order Counter |
|---|---|---|---|
|  | 16 8 4 2 1 | 16 8 4 2 1 | 16 8 4 2 1 |
| Counters at beginning of 1st machine cycle | 0 0 0 0 0 | 0 0 0 0 0 | 0 0 0 0 0 |
| +7 Card Entry |  |  | 0 0 1 1 1 |
| Counters after +7 Card Entry | 0 0 0 0 0 | 0 0 0 0 0 | 0 0 1 1 1 |
| +6 Supplement Entry |  | 0 0 1 1 0 | 0 0 1 1 0 |
| Counter after Supplement Entry | 0 0 1 1 0 | 0 0 1 1 0 | 0 1 1 0 1 |
| Counters after Decimal Carry | 0 0 1 1 0 | 0 0 1 1 0 | 0 1 1 0 1 |
| +10 Correction Entry | 0 1 0 1 0 | 0 1 0 1 0 | 0 1 0 1 0 |
| Counters after +10 Correction | 0 0 0 0 0 | 0 0 0 0 0 | 0 0 1 1 1 |
| Counters after 16's Reset | 0 0 0 0 0 | 0 0 0 0 0 | 0 0 1 1 1 |
| Counter at end of cycle indicates 7 in binary coded form | 0 0 0 0 0 | 0 0 0 0 0 | 0 0 1 1 1 |

CYCLE #2
(Operation +6 to give sum of +13)

|  | Hundreds Order Counter | Tens Order Counter | Units Order Counter |
|---|---|---|---|
|  | 16 8 4 2 1 | 16 8 4 2 1 | 16 8 4 2 1 |
| Counters at beginning of 2nd machine cycle | 0 0 0 0 0 | 0 0 0 0 0 | 0 0 1 1 1 |
| +6 Card Entry | 0 0 0 0 0 | 0 0 0 0 0 | 0 0 1 1 0 |
| Counters after +6 Card Entry | 0 0 0 0 0 | 0 0 0 0 0 | 0 1 1 0 1 |
| +6 Supplement Entry | 0 0 1 1 0 | 0 0 1 1 0 | 0 0 1 1 0 |
| Counters after supplement entry | 0 0 1 1 0 | 0 0 1 1 0 | 1 0 0 1 1 |
| Decimal Carry |  | 1 |  |
| Counters after Decimal Carry | 0 0 1 1 0 | 0 0 1 1 1 | 1 0 0 1 1 |
| +10 Correction Entry | 0 1 0 1 0 | 0 1 0 1 0 | 0 0 0 0 0 |
| Counters after +10 Correction | 0 0 0 0 0 | 0 0 0 0 1 | 1 0 0 1 1 |
| Counters after 16's Reset | 0 0 0 0 0 | 0 0 0 0 1 | 0 0 0 1 1 |
| Counter at end of cycle indicates 13 in binary coded form | 0 0 0 0 0 | 0 0 0 0 1 | 0 0 0 1 1 |

*First machine cycle*

During the second cycle point of the first machine cycle, the closing of cam contact 123 completes a circuit from the power line 116, through the cam contact 123, now closed, the isolation rectifier 154, the conductor 155, the normally closed side of the entry control switch 34 of each of the three counters, and finally through the related counter control magnet 76 to ground. The resultant momentary energization of each of the control magnets 76 at this time effects the transfer of the related entry control switch in the manner previously explained. Each switch 34 remains transferred until the beginning of the sixteenth cycle point of this machine cycle when it is restored by the high dwell of the associated cam 71 in the manner previously explained.

As the "4" index point perforation of the first record moves between the "units" brush 114 and the contact roll 115 during the latter part of the fourth cycle point of the machine cycle, a circuit is completed from the power line 116, through cam contact 117, now closed, the card lever contact 118, now closed, the common brush 120, the contact roll 115, the "units" brush 114, the conductor 121, the normally closed side of the related reset switch 35, the normally open side of the related number 1 program switch 31, now closed as indicated in Fig. 14, the related transferred entry control switch 34, and finally through the related control magnet 76 to ground. The resultant momentary energization of the units order magnet 76 unlatches the "16," "8," "4," "2" and "1" drive arms 86. At this time, the "4" carry test arm 104 is shifted as indicated in Figs. 12 and 14 and with a low dwell of the cam 61 adjacent the "4" drive arm 86, this drive arm is free to operate. The operation of the "4" drive arm enters a binary one in the "4" binary place position of the units order counter in the manner previously explained.

As the "2" index point perforation of the first record is sensed during the latter part of the sixth cycle point of the machine cycle, a circuit is completed through the same circuit previously traced to again impulse the control magnet 76 of the units order counter. As a result, the "16," "8," "4," "2" and "1" drive arms of the units order counter are again unlatched. As previously explained, however, only the "2" drive arm is free to operate at this time. The operation of the "2" drive arm enters a binary one in the "2" binary place position of the units order counter in the manner previously explained.

As the "1" index point perforation of the first record is sensed during the latter part of the seventh cycle point of the machine cycle, a circuit is completed through the same circuit previously traced to again impulse the control magnet 76 of the units order counter. As a result, the "16," "8," "4," "2," and "1" drive arms of the units order counter are again unlatched. As previously explained, however, only the "1" drive arm is free to operate at this time. The operation of the "1" drive arm enters a binary one in the "1" binary place position of the units order counter in the manner previously explained.

As a result of the above operations, there is a binary one registered in the "4," "2," and "1" binary counting wheels 91 at the end of the card entry portion of the first machine cycle. The counter is, therefore, representative of the decimal value seven in binary coded form.

During the eighth and ninth cycle points of the machine cycle, a supplemental value of +6 in binary coded form is entered into each order counter. This entry is utilized to determine if the number represented in each counter is greater than 9. If the number in the counter is greater than 9, the addition of +6 thereto forces a carry into the 16's binary counting wheel 91. This 16's carry is utilized to effect a decimal carry to the next higher order counter in a manner to be later explained.

Returning to our particular example, the +6 supplement entry is effected as follows: During the latter part of the eighth cycle point of the first machine cycle, the momentary closing of cam contact 133 completes a circuit from the power line 116, through the cam contact 133, conductor 156, the normally closed side of contacts 158c of a relay R158, conductor 159, the normally closed side of contacts 161b of a relay R161, conductor 162, through the normally closed side of the "16's" carry switch 26 of each counter, the normally closed side of the associated number 2 program switch 27, the normally closed side of the related number 1 program switch 31, the normally open side of the related entry control switch 34, and finally through the related control magnet 76 to ground. The resultant momentary energization of the magnets 76 of the three counters of the accumulating machine, unlatches their related "16," "8," "4," "2," and "1" drive arms 86.

Referring to Figs. 12 and 14, it will be noted that at this time the "4" carry test arm 104 of each counter is "shifted" and at the same time there is a low dwell in cam 61 adjacent the "4" drive arm 86. Consequently, the "4" drive arm of each counter is free to operate. The operation of the "4" drive arm of the tens and hundreds order counters, registers a binary one in the related "4" binary place position in the manner previously explained. In the units order counter, the operation of the "4" drive arm also permits the associated "8" drive arm to operate. The "8" drive arm is able to operate because first, an operational notch in the cam 58 is adjacent the "8" drive arm at this time; second, the surface 110 of the associated unshifted "8" carry test arm 104 finds a low dwell in the "4" binary counting wheel since a binary one was previously registered therein during the card entry interval; and third, the abutment of the surface 112 of the "8" carry test arm with the "4" carry test arm is of no consequence since the "4" carry test arm rotates with the associated "4" feed arm. The operation of the "8" drive arm registers a binary one in the "8" counting wheel while the operation of the "4" drive arm advances the "4" counting wheel from a binary one indication to a binary zero indication.

During the latter part of the ninth cycle point of the first machine cycle, the cam contact 133 again closes to momentarily impulse the control magnet 76 of all three counters through the circuit previously traced. During the interval when the magnets 76 are energized, the related "16," "8," "4," "2," and "1" drive arms 86 are unlatched. Referring to Figs. 12 and 14, it will be noted that at this time the "2" carry test arm 104 of each counter is shifted and at the same time there is low dwell in cam 65 adjacent the "2" drive arm. Consequently, the "2" drive arm of each counter is free to operate. The operation of the "2" drive arm of the tens and hundreds order counters registers a binary one in the related "2" binary counting wheel in the manner previously explained. In the units order counter, the operation of the "2" drive arm also permits the "4" drive arm to operate. The "4" drive arm is able to operate because, first, a low dwell in the cam 61 is adjacent the "4" drive arm at this time; second, the surface 110 of the associated unshifted "4" carry test arm 104 finds a low dwell in the "2" binary counting wheel since a binary one was previously registered therein during the entry of the "4" supplemental value; and third, the abutment of the surface 112 of the "4" carry test arm with the "2" carry test arm is of no consequence since the "2" carry test arm is free to rotate with the associated "2" drive arm 86. The operation of the "4" drive arm registers a binary one in the "4" counting wheel while the operation of the "2" drive arm advances the "2" counting wheel from a binary one indication to a binary zero indication.

As a result of the above operations, the accumulating machine is registering the value 6 in binary coded form in the tens and hundreds order counters while 13 in binary coded form is registered in the units order counter. The absence of a binary carry into the 16's counting wheel of each of the counters signifies that the number represented in each order of the counter prior to the supplement 6 operation was equal to or less than nine. Consequently, there is no need for a decimal carry operation in any counter. The absence of a 16's carry in each counter, which in turn prevents a decimal carry into the next higher order counter, is determined electrically as follows: During the latter part of the tenth cycle point of the counter cycle, the closing of the cam contact 131 completes a circuit from the power line 116, through the cam contact 131, the normally closed side of contacts 158b of relay R158, the conductor 160 to the normally open side of the carry or 16's switch 26 of each counter. Since there was no 16's carry in any of the counters, the decimal carry circuit ends at this point. Consequently, at the end of decimal carry time, a 6 is still registered in the tens and hundreds order counters and a 13 is registered in the units order counter.

As a result of the +6 supplement operation, each order of the counter is now too high by a factor of 6. Six can be subtracted from each order of the counter by entering a correction factor of +10 into each counter and preventing the resultant 16's carry. Thus, the net result of the entry of the +6 supplement value and the +10 correction value to each counter is to "roll" the counter through 16 units back to its original value.

The +10 correction operation is effected as follows: During the latter part of the eleventh cycle point of the machine cycle, the closing of cam contact 133 completes a circuit from the power line 116, through the cam contact 133, the conductor 156, the normally closed side of contacts 158c of relay R158, the normally closed contacts 161b, the conductor 162, the normally closed side of the 16's switch 26 of each counter, the normally closed side of the related number 2 program switch 27, the normally closed side of the related number 1 program switch 31, the normally open side of the related entry control switch 34, still closed at this time, and finally through the related control magnet 76 to ground. The resultant energization of each of the control magnets 76 again effects the unlatching of the 16, 8, 4, 2, and 1 drive arms of that counter.

Referring to Fig. 14, it will be noted that at this time the "8" carry test arm 104 of each counter is shifted and a low dwell in cam 58 is adjacent the associated "8" drive arm. As a result, the 8 drive arm of each of the counters is free to operate. The operation of the 8 drive arm of the tens and hundreds order counters registers a binary one in the "8" counting wheel of that counter. The operation of the "8" feed arm of the units order counter advances the associated "8" counting wheel from a binary one to a binary zero indication. This operation of the "8" drive arm of the units counter ordinarily would permit a simultaneous operation of the adjacent 16's drive arm. It will be noted in Fig. 14, however, that there is no operational notch in cam 54 adjacent to the 16's drive arm at this time, and, as a result, the conventional binary transfer into the associated 16's position is prevented.

During the latter part of the 13th cycle point, the momentary closing of cam contact 133 again completes a circuit through the normally closed side of the 16's switch 26 of each counter to again impulse the control magnet 76 of that counter. The momentary energization of the control magnet 76 of each counter again unlatches the related "16," "8," "4," "2," and "1" drive arms. Referring to Fig. 14, it will be noted that at this time the "2" carry test arm 104 of each counter is shifted and an operational notch in cam 65 is adjacent the associated "2" drive arm 86. As a result, the "2" drive arm of each counter is free to operate. It will be noted also in Fig. 14 that operational notches in cams 58 and 61 are also adjacent the 8 and 4 feed arms of each counter at this time. Consequently, since there is a binary one registered in the "8," "4," and "2" counting wheels of the tens and hundreds order counters, the operation of the "2" drive arm of each of these counters permits the associated "8" and "4" drive arms to operate also. The operation of the "8," "4," and "2" drive arms of the tens and hundreds order counters advances each of the related binary counting wheels from a binary one to a binary zero indicating position. Consequently, these counters have been restored to the desired decimal zero representation. The operation of the "2" drive arm of the units order counter advances the related "2" counting wheel from a binary zero to a binary one indicating position. Only the "2" drive arm is free to operate in this counter since the "4" carry test arm initially finds a binary zero in the 2 counting wheel and as a result, the "4" drive arm and the remaining higher binary order drive arms of the counter are prevented from operating for reasons previously explained in detail in reference to similar operations. As a result of the above operation and previous operations, the units order counter has a binary one registered in its "4," "2," and "1" binary counting wheels. The units order counter then contains the desired value of seven in binary coded form. During the sixteenth cycle point, the entry control switch 34 of each counter is restored in the manner previously explained. The net result of all the above operations during the first counter cycle is that the number 7 in binary coded form is now represented in the units order counter while the tens and hundreds order counters are representative of zero.

*Second machine cycle*

As mentioned previously, a second record card which is perforated to represent the value six in binary coded form is sensed during the second machine cycle. As a result of the momentary closing of cam contact 123 during the latter part of the second cycle point of this machine cycle, the control magnet 76 of each of the counters is impulsed through the same circuit described in the first machine cycle operation. As a result of the impulsing of each magnet 76, the associated entry control switch 34 is transferred as also explained previously. Each switch 34 remains transferred until the beginning of the sixteenth cycle point of this machine cycle when it is restored by the high dwell of the associated cam 71.

As the "4" index point perforation of the second record moves between the "units" brush 114 and the contact roll 115 during the latter part of the fourth cycle point of this second machine cycle, a circuit is completed, in the same manner as explained in the first machine cycle, to impulse the control magnet 76 of the units order counter. The impulsing of the units order magnet 76 unlatches the related "16," "8," "4," "2," and "1" drive arms 86. At that time, the "4" carry test arm 104 is "shifted" and with a low dwell of the cam 61 adjacent the "4" drive arm, the arm is free to operate. As the "4" drive arm operates, the "8" drive arm is also permitted to operate since first, there is low dwell in the cam 58 adjacent the "8" arm at that time, and second, the associated "8" carry test arm 104 finds a binary one in the "4" counting wheel 91. The operation of the "4" drive arm advances the "4" counting wheel from a binary one indication to a binary zero indication, while the operation of the "8" drive arm registers a binary one in the "8" counting wheel.

As the "2" index point perforation of the second record is sensed during the latter part of the sixth cycle point of the machine cycle, the control magnet 76 of the units order counter is impulsed again to unlatch the "16," "8," "4," "2," and "1" drive arms of the counter. At this time, the "2" carry test arm 104 is "shifted" and with a low dwell of the cam 65 adjacent the associated "2" drive arm, the drive arm is free to operate. As the "2" drive arm operates, the associated "4" drive arm is also permitted to operate since first, there is a low dwell in cam 61 adjacent to the "4" drive arm at that time, and second, the associated "4" carry test arm 104 finds a binary one in the adjacent "2" counting wheel 91. The operation of the "2" drive arm advances the "2" counting wheel from a binary one to a binary zero indication, while the operation of the "4" drive arm registers a binary one in the "4" counting wheel.

As a result of the above counter entry operations under the control of the "6" card, the units order counter at the end of card entry time indicates the sum of 13 in binary coded form, there being a binary one in the 8, 4, and 1 counting wheels. During the eighth and ninth cycle points of this cycle, the +6 supplement value is entered into each counter in the same manner as described in the first machine cycle operation. The entry of +6 into the units order counter advances this counter in the conventional manner so that it then represents 19, there being a binary one in the 16, 2, and 1 counting wheels. The presence of a binary one in the 16's counting wheel indicates that the sum digit in the units order counter prior to the +6 supplement operation was greater than 9 so a decimal carry must be effected from the units to the tens order counter. Referring to Fig. 14, it will be noted that during the tenth cycle point, the readout arms of each counter are operated. The only readout arm which we are interested in at this time is the 16's readout arm of the units order counter. This readout arm finds a binary one in the related 16's counting wheel so that its related switch 26 is permitted to transfer. During the latter part of the tenth cycle point while switch 26 is still transferred, the momentary closing of cam contact 131 completes a circuit from the power line 116, through cam contact 131, the normally closed side of contacts 158b, the conductor 160, the normally open side of the "16's" switch 26 of the units order counter, now closed, the normally open side of the related number 2 program switch 27 now closed as indicated in Fig. 14, the conductor 163, the normally closed side of the related "15's" test switch 29, the conductor 164, and finally through the tens order counter control magnet 76 to ground. The impulsing of the magnet 76 of the tens order counter unlatches its "16," "8," "4," "2," and "1" drive arms. Referring again to Fig. 14, it will be noted that the "16," "8," "4," and "2" carry test arms 104 are not shifted at this time and since the "2" carry test arm finds a zero in the "1" counting wheel (the tens order counter is registering 6 in binary coded form), the "2" drive arm and the associated "4," "8," and "16" drive arms are blocked against operation even though they are adjacent low dwells in their related control cams. Since there is nothing blocking the "1" carry test arm, however, and since there is a low dwell in cam 68 adjacent the "1" drive arm at this time, the "1" drive arm is free to operate. The operation of the "1" drive arm registers a binary one in the associated "1" counting wheel. Since the tens counter was already registering six in binary coded form, it now represents 7 in binary coded form.

Reviewing the status of the counters at this time, the hundreds order counter is registering six, the tens order counter is registering seven, while the units order counter is registering nineteen (a binary one in the 16's, 2 and 1 counting wheels). The desired sum of 13, one in the tens order counter and three in the units order counter, is effected by the entry of the +10 correction factor in the hundreds order counter thus restoring it to zero; the entry of the +10 correction factor in the tens order counter, thus rolling it to a 1 indication; and the clearing out of the binary one in the 16's counting wheel of the units order counter thus leaving the desired indication of 3 in binary coded form. The above actions are effected as hereinafter explained.

The momentary closing of cam contact 133 during the latter part of the eleventh cycle point completes a circuit from the power line 116, through conductor 156, the normally closed side of contacts 158c, the conductor 159, the normally closed contacts 161b, the conductor 162, the normally closed side of the "16's" switch 26 of the hundreds and tens order counters, the normally closed side of the related number 2 program switch 27, through the normally closed side of the related number 1 program switch 31, the related transferred entry control switch 34, and finally through the related control magnet 76 to ground. The impulsing of the magnets 76 of the tens and hundreds order counters unlatches their "16," "8," "4," "2," and "1" drive arms. Referring to Fig. 14, it will be seen that only the "8" drive arm 86 of each counter is free to operate at this time. The operation of the 86 drive arm of the counters registers a binary one in the related 8 counting wheel. As a result of this operation, the tens and hundreds order counters are then representing 14 in binary coded form.

During the latter part of the thirteenth cycle point of this counter cycle, the momentary closing of cam contact 133 again impulses the control magnets 76 of the tens and hundreds order counters through the same circuit previously traced. As before, the impulsing of these magnets unlatches the "16," "8," "4," "2" and "1" drive arms of their related counters. Referring to Fig. 14, it will be noted that at this time, the "2" carry test arm 104 of each counter is shifted and a low dwell in cam 63 is adjacent the associated "2" drive arm. As a result, the "2" drive arm of the tens and hundreds order counters are free to operate. It will be noted that operational notches in cams 58 and 61 are adjacent the "8" and "4" drive arms of each counter at this time also. Consequently, since there is a binary one registered in the "8," "4," and "2" counting wheels of the tens and hundreds order counters, the operation of the "2" drive arm of each of these counters permits the associated "8" and "4" binary order drive arms to operate for reasons previously explained in detail in regard to other similar operations. The operation of the 8, 4, and 2 drive arms of the tens and hundreds order counters advances each of the related binary counting wheels from a binary one to a binary zero indicating position. As a result of these operations, the hundreds order counter is representative of zero while the tens order counter has a binary one remaining in the "1" counting wheel and thus represents the decimal value 1.

It will be noted in Fig. 14 that the "16's" switch 26 of the units order counter is transferred during the 11th, 12th and 13th cycle points since a binary one is registered in the related counting wheel. Consequently, the +10 correction pulses are unable to reach the units order counter and have no effect on this counter. Referring again to Fig. 14, it will be noted that during the fifteenth cycle point, the "16" readout arm 97 of each counter is again operated to determine if a binary one or zero is present in the related counting wheel. The 16 readout arm of the units order counter finds a binary one in the related counting wheel so that the related "16's" switch 26 again transfers in the manner previously described. During the latter part of the fifteenth cycle point of the counter cycle, the momentary closing of cam contact 131 completes a circuit from the power line 116, through the normally closed side of contacts 158b, the conductor 160, the normally open "16's" switch 26 of the units order counter, now closed, the normally closed side of the related number 2 program switch 27, the normally closed side of the related number 1 program switch 31, the normally open side of the related entry control switch 34, and finally through the related control magnet 76 to ground. The resultant momentary energization of the control magnet 76 again unlatches the "16," "8," "4," "2" and "1" drive arms of the units order counter. Referring to Fig. 14, it will be noted that at this time the "16" carry test arm 104 is shifted and a low dwell in cam 54 is adjacent associated "16" drive arm. As a result, the 16 drive arm is free to operate. The operation of the "16" drive arm advances the 16 counting wheel from a binary one to a binary zero indication.

Thus, at the end of the second machine cycle, the desired sum of 13 is represented in the counter, the tens order counter indicating the decimal value 1 in binary coded form, while the units order is indicating the decimal value 3 in binary coded form.

*Subtraction*

Subtraction is effected by the accumulating machine by the well known method of complementing. In subtraction, as in addition, various supplement values and correction values are required in order to effect decimal carry. It is believed that the subtraction operation may be best illustrated by following the operation of the machine in an actual operation. With 13 setting in the accumulate machine as a result of the previous operation of 7+6, the value 6 will be subtracted therefrom to give a difference value of 7. This is effected by feeding into the machine a third record card having "6" punched therein in binary coded form. This third record includes a perforation in the J control position of its hundred order column to signify that this record contains a negative value.

It will be appreciated that in subtracting one number from another by complement addition, it does not matter which number is inverted to its complement form provided, of course, attention is paid to the sign of the answer. In this particular counter, it is advantageous to invert the value (A) already in the counter and then read in the negative number (B) in true number form. If B is smaller than A, the difference value generated must then be reinverted to give a true number form. If A is smaller than B, the difference value generated will be in its true number form and reinversion will not be required. In our particular example of 13 (A)−6(B), the difference value generated in the counter must be reinverted to give the true number answer +7. The various operations by which 6 is subtracted from 13 to give a difference of 7 is represented diagrammatically below. The manner in which these counter operations are effected will now be explained in detail.

CYCLE #3
(Operation −6 to give difference of +7)

| | | | |
|---|---|---|---|
| Counters at beginning of 3rd machine cycle | 0 0 0 0 0 | 0 0 0 0 1 | 0 0 0 1 1 |
| Counters after Invert Operation | 0 1 1 1 1 | 0 1 1 1 0 | 0 1 1 0 0 |
| 6 Card Entry | | | 0 0 1 1 0 |
| Counters after 6 Card Entry | 0 1 1 1 1 | 0 1 1 1 0 | 1 0 0 1 0 |
| Decimal Carry | | 1 | |
| Counters after Decimal Carry | 0 1 1 1 1 | 0 1 1 1 1 | 1 0 0 1 0 |
| +6 Correction Entry | | | 0 0 1 1 0 |
| Counters after +6 Correction | 0 1 1 1 1 | 0 1 1 1 1 | 1 1 0 0 0 |
| Counters after Reinvert Operation | 0 0 0 0 0 | 0 0 0 0 0 | 1 0 1 1 1 |
| Counters after 16's Reset | 0 0 0 0 0 | 0 0 0 0 0 | 0 0 1 1 1 |
| Counter at end of cycle indicates +7 in binary coded form | 0 0 0 0 0 | 0 0 0 0 0 | 0 0 1 1 1 |

Third machine cycle

During the latter part of the second cycle point of the third machine cycle, the J perforation of the "6" record is sensed. As a result, a circuit is completed from the power line 116, through cam contact 117, the card lever contact 118, the common brush 120, the "hundreds" order brush 114, the conductor 121A, the normally open side of contacts 167b of a relay R167, now closed since relay R167 is energized at this time through cam contact 129 as will be noted in Fig. 14, through the pick coil of an addend sign relay R168 to ground. The resultant energization of relay R168 causes its normally open contacts 168a to close, and its contacts 168b to transfer. The closing of the contacts 168a completes a circuit from the power line 116, through cam contacts 126, now closed, an isolation rectifier 169, a conductor 170, the contacts 168a, and through the hold coil of relay R168 to ground. Relay R168 is held energized through cam contact 126 until the cam contact opens at the end of the tenth cycle point of the cycle whereafter it is held energized through a cam contact 125 and an isolation rectifier 171 until this latter cam contact opens at the end of the fourteenth cycle point.

Also during the latter part of the second cycle point of the third machine cycle, the closing of cam contact 123 momentarily energizes the control magnet 76 of each counter through the circuit previously traced in the addition example. The impulsing of each of the control magnets 76 at this time effects the transfer of the related entry control switch 34 in the manner previously explained. Each switch 34 remains transferred until the beginning of the sixteenth cycle point of this machine cycle when it is restored by the high dwell of the associated cam 71.

The closing of cam contact 127 at the beginning of the third cycle point of the machine cycle completes a circuit from the power line 116, through the cam contact 127, the normally closed side of contacts 174b of a relay R174, the normally open side of contacts 168b, now closed, the conductor 175, and through the pickup coil of the subtract control relay R158 to ground. The energization of relay R158 causes its normally open contacts 158a to close, and its contacts 158b and 158c to transfer. The closing of the contacts R158a completes a circuit from the power line 116, through the cam contact 126, a conductor 176, the contacts 158a, and through the hold coil of the relay R158 to ground. Relay R158 is held energized through cam contact 126 until the cam contact opens at the end of the tenth cycle point of the cycle whereafter it is held energized through cam contact 125, conductor 177, the normally closed side of contacts 178a of a relay R178, a conductor 179, conductor 176 etc., until cam contact 125 opens at the end of the fourteenth cycle point of the machine cycle.

During the latter part of the third cycle point of the machine cycle, the closing of cam contact 132 completes a circuit from the power line 116, through the normally open side of contacts 158c, now closed, the conductor 159, the normally closed contacts 161b of relay R161, the conductor 162, the normally closed side of the "16's" switch 26 of each counter, through the normally closed side of the related number 2 program switch 27, the normally closed side of the related number 1 program switch 31, the normally open side of the related entry control switch 34, now closed, and through the related counter magnet 76 to ground. The energization of the control magnet 76 of each counter unlatches the associated "16," "8," "4," "2," and "1" drive arms 86. Referring to Fig. 14, it will be noted that at this time the "8," "4," and "2" carry test arms 104 of each counter are shifted while low dwells in cams 58, 61, 65, and 68 are adjacent their related "8," "4," "2" and "1" drive 86 arms respectively. As a result, the "8," "4," "2" and "1" drive arms of each counter are free to operate. The operation of each drive arm advances its related counting wheel from a binary one to a binary zero indication or vice versa dependent upon whether a binary one or zero was previously registered therein. The operation of the four drive arms of each counter in effect inverts each counter on a 15's complement basis. Consequently, after the invert operation, the hundreds order counter, which was previously indicating zero, is now indicating 15 in binary coded form; the tens order counter, which was previously indicating 1 in binary coded form, is now indicating 14 in binary coded form; while the units order counter, which was previously indicating 3 in binary coded form, is now indicating 12 in binary coded form.

It will be appreciated that by inverting the counters on a 15's complement basis rather than on the conventional 9's complement basis, the counters already include the 6 supplement entry by which decimal carry is determined. Consequently, the normally automatic entry of +6 into each counter from cam 133 later in the cycle (during the 8th and 9th index points) must be suppressed. This suppress action is effected as one of the results of the subtract relay R158 being energized during this cycle with the normally closed side of its contacts 158c through which the +6 pulses from cam 133 usually pass being transferred. Returning again to our example, with the original value 13 now inverted as a result of the J control perforation in the third record, the binary coded value "6" recorded therein is then entered into the units order counter in the conventional manner.

At the end of the card entry interval of the third macine cycle, the hundreds counter is indicating 15, the tens counter is indicating 14, while the units counter is indicating 18 (a binary one in the 16's and 2 counting wheels). The binary carry into the 16's counting wheel of the units order counter during the card entry interval of the third machine cycle signifies that a decimal carry should be effected from the units to the tens order counter. Decimal carry is effected through the transferred "16's" switch 26 of the units order counter during the latter part of the tenth cycle point of this cycle in the same manner as described in the second machine cycle. Consequently, at the end of the tenth cycle point of the third machine cycle, the hundreds counter is indicating 15, the tens counter is indicating 15 (14+decimal carry), while the units counter is still indicating 18. The carry into the 16's position of the units order counter removed 16 from this counter, the value 16 being made up of the decimal 10 and the +6 supplement automatically added by the original inversion. A +6 correction is required in the units order counter to give the desired answer of +7 in 15's complement form for reinversion.

The +6 correction is effected as follows: Referring to Fig. 14, it will be noted that the "16" readout arm 97 of each counter is operated during the eleventh, twelth and thirteenth cycle points of the counter cycle. The "16's" readout arm of the units order counter finds a binary one in the related "16" counting wheel 91 and, as a result, the related "16's" switch 26 is transferred during this interval. During the latter part of the twelfth cycle point, the momentary closing of cam contact 130 completes a circuit from the power line 116, through the cam contact 130, the normally open side of contacts 158b now transferred as relay R158 is still energized at this time, the conductor 160, the transferred "16's" switch 26 of the units order counter, the normally closed side of the related number 2 program switch 27, the normally closed side of the related number 1 program switch 31, the normally open side of the related entry control switch 34, still closed at this time, and through the related control magnet 76 to ground. The impulsing of the units order counter control magnet again effects the unlatching of the "16," "8," "4," "2," and "1" drive arms of that counter. Referring to Fig. 14, it will be noted that at this time the "4" carry test arm 104 of the counter is shifted and a low dwell in cam 61 is adjacent the associated "4" drive arm 86. As a result, the unlatched "4" drive arm of the units counter is free to operate. The operation of the "4" drive arm advances the related "4" counting wheel 91 from a binary zero to a binary one indication. Thus, at the end of the operation, the units order counter has a binary one in its "16," "4," and "2" counting wheels.

During the latter part of the thirteenth cycle point, the momentary closing of cam contact 130 again completes a circuit through the transferred "16's" switch 26 of the units order counter and the units order counter control magnet 76. This momentary energization of the control magnet again unlatches the related "16," "8," "4," "2" and "1" drive arms. Referring to Fig. 14, it will be noted that at this time the "2" carry test arm 104 of the counter is shifted and an operation notch in cam 65 is adjacent the related "2" drive arm 86. It will be noted in Fig. 14 that low dwells in cams 58 and 61 are adjacent the "8" and "4" drive arms at this time also. Consequently, since there is a binary one registered in the "4" and "2" counting wheels of the units order counter, the operation of the "2" drive arm 86 permits the associated "8" and "4" drive arms to operate for reasons previously explained in detail in regard to similar operations. The operation of the "4" and "2" drive arms advances the related "4" and "2" counting wheels from a binary one indication to a binary zero indication. The operation of the "8" drive arm registers a binary one in the "8" counting wheel. Thus, at the end of this counter operation, the units order has a binary one in its "16" and the "8" counting wheels. Since the binary one in the 16's counting wheel will be cleared out during the fifteenth cycle point in the same manner as described in the second machine cycle, the units order counter is now indicating the value "8" in binary coded form.

If we ignore the binary one in the 16's counting wheel of the units order counter, the status of the counters at the end of the thirteenth cycle point of the third cycle is 15, is registered in each of the hundreds and tens counters, while 8 is registered in the units order counter. The counter is, therefore, indicating the desired answer of +7 in 15's complement form so a reinversion operation must be performed. This is effected as follows: Referring to Fig. 14, it will be noted that during the fourteenth cycle point, the "16's" readout arm 97 of each counter is in its inoperative position and, as a result, the related "16's" switch 26 is positioned in its normal position even though there may be a binary one in the related "16's" counting wheel 91 (as in the units order counter). During the later part of the fourteenth cycle point, the momentary closing of cam contact 132 completes a circuit from the power line 116, through the normally open side of contacts 158C, still closed as relay R158 is still energized at this time, the normally closed contacts 161b, the conductor 162, the normally closed side of the "16's" switch 26 of each counter, the normally closed side of the related number 2 program switch 27, the normally closed side of the related number 1 program switch 31, the normally open side of the related entry control switch 34, now closed, and through the related counter magnet 76 to ground. The energization of the control magnet 76 of each counter unlatches the associated "16," "8," "4," "2," and "1" drive arms. Referring to Fig. 14, it will be noted that at this time the "8," "4," and "2" carry test arms 104 of each counter are shifted while low dwells in cams 58, 61, 65 and 68 are adjacent their related "8," "4," "2" and "1" drive arms 86, respectively. As a result, the "8," "4," "2" and "1" drive arms of each counter are free to operate. The operation of each drive arm advances its related counting wheel 91 from a binary one to binary zero indication or vice versa dependent upon whether a binary zero or one was previously registered therein. Consequently, after this reinvert operation, the hundreds and tens order counter represent zero while the units order counter represents 7 in binary coded form, if its 16's position is ignored. This is the desired result. The 16's position of the units counter is reset during the 15th cycle point in the same manner described previously.

In the above described operation, the minuend 6 (B) was smaller than the subtrahend 13 (A) so a reinvert operation was required to achieve the difference 7 in true number. If we were to subtract 13 from the 7 presently in the counter, the difference value 6 is generated in its true number form as indicated below so that the reinversion operation is suppressed.

CYCLE #4

(+7−13=−6)

| | | | |
|---|---|---|---|
| Counters at beginning of cycle indicates +J | 0 0 0 0 0 | 0 0 0 0 0 | 0 0 1 1 1 |
| Counters after Invert Operation | 0 1 1 1 1 | 0 1 1 1 1 | 0 1 0 0 0 |
| 13 Card Entry | | 1 | 1 1 |
| Counters after 13 Card Entry | 0 1 1 1 1 | 1 0 0 0 0 | 0 1 0 1 1 |
| Decimal Carry | 1 | | |
| Counters after Decimal Carry | 1 0 0 0 0 | 1 0 0 0 0 | 0 1 1 0 0 |
| +10 Correction in Counters from which there was no decimal carry | | | 0 1 0 1 0 |
| Counters after +10 Correction | 1 0 0 0 0 | 1 0 0 0 0 | 1 0 1 1 0 |
| Counters after 16's reset operation | 0 0 0 0 0 | 0 0 0 0 0 | 0 0 1 1 0 |
| Counters at end of cycle indicate 6 in binary coded form | 0 0 0 0 0 | 0 0 0 0 0 | 0 0 1 1 0 |

*Fourth machine cycle*

It will be noted above that the decimal carry from the tens to the hundreds order counter in cycle number 4 above, "forces" a decimal carry from the hundreds order counter. This decimal carry from the highest order is applied to the units order counter and is commonly defined as an end-around carry or fugitive one. The presence of the end around carry in this accumulating machine is effective for controlling a +10 correction entry into each counter from which there was no decimal carry emitted (units order counter in this example) and is also effective for suppressing the reinvert operation. This action is effected as hereinafter explained.

During the latter part of the tenth cycle point of the fourth cycle, the momentary closing of cam contact 130 completes a circuit from the power line 116, through the contact 130, the normally open side of contacts 158b, now closed, the conductor 160, the normally open side of the "16's" switch 26 of the tens order counter, now closed, the normally open side of the related number 2 program switch 27, now closed, the conductor 163, the normally closed side of the related "15's" extend switch 29, the conductor 164, and through the control magnet 76 of the hundreds order counter to ground. With fifteen standing in the hundreds order counter at this time so that the related "15's" extend switch 29 is transferred, the carry circuit also extends from the conductor 164 through the normally open side of the "15's" extend switch 29 of the hundreds order counter, now closed, a conductor 181, and through the units order counter magnet 76 to ground. As a result of the impulsing of the hundreds and units order counter magnets, one is added to each related counter in the regular manner. Thus, at the end of the decimal carry operation, the hundreds order counter represents 16, the tens order counter represents 16, and the units order counter represents 12.

In addition to effecting a decimal carry into the hundreds and units order counters, the carry pulse is utilized to energize the pick up coil of end carry relay 178. This circuit extends from the transfer member of the hundreds order "15's" extend switch 29, through a conductor 182, the normally closed contacts 161f of relay R161, and through the pick up coil of relay 178 to ground. The energization of the relay 178 causes its contacts 178a and b to transfer. The transferring of contacts 178a completes a circuit from the power line 116, through cam contact 125, now closed, conductor 177, the normally open side of contacts 178a now closed, and through the hold coil of relay 178 to ground. Relay R178 is held energized until cam contact 125 opens at the end of the fourteenth cycle point of the cycle. It will be noted in Fig. 13B that the transferring of the contacts 178a opens the hold circuit to the subtract control magnet R158 so that it is deenergized. The deenergization of relay 158 suppresses reinversion of the counters as will be later evident.

As a result of the transferring of contacts 178b, the momentary closing of cam contact 128 during the latter part of the 14th cycle point completes a circuit from the power line 116, through a conductor 182, the normally closed side of contacts 174d, the normally open side of contacts 178b, now closed, and through the pick up coil of a relay R183 to ground. The energization of relay R183 causes its normally open contacts 183a and b to close. The closing of contacts 183a completes a circuit from the power line 116, through a conductor 184, the contacts 174c, and through the hold coil of relay R183 to ground. The closing of contacts R183b sets up a circuit whereby the augend sign relay R174 is energized during the second cycle point of the next machine cycle (fifth) thus signifying that the difference value generated in the counter during the fourth cycle was a negative value. This operation will be later explained.

As will be noted in Fig. 14, the "16's" readout arm 97 of the counters are in their operative position during the eleventh, twelfth, and thirteenth cycle points of each machine cycle. Since there is a binary one in the "16's" counting wheel 91 of the hundreds and tens order counters during the fourth machine cycle, the related "16's" switches 26 are transferred during this interval. The "16's" switch of the units order counter occupies its normal position during this interval since the related 16's counting wheel is indicating a binary zero. Consequently, the +10 correction pulses from cam contact 133 are applied only to the units order control magnet 76. After the +10 correction operation in the fourth machine cycle, the hundreds and tens order counters are still indicating 16 while the units order counter is now indicating 6.

With the subtract relay R158 being deenergized as a result of the energization of the end carry relay R178 as previously explained, the reinvert pulse from cam contact 132 during the latter part of the fourteenth cycle point of the fourth machine cycle terminates at the contacts R158c and has no effect on the counters. During the latter part of the fifteenth cycle point, the momentary closing of cam contact 131 clears the binary one's out of the hundreds and tens order 16's counting wheels 91 in a manner previously explained in detail. Consequently, at the end of the fourth machine cycle, the hundreds and tens counters are indicating zero while six remains in the units order counter. This is the desired result.

During the second cycle point of the next (fifth) machine cycle when the relay R167 is energized by the closing of cam contact 129 in the normal manner, a circuit is completed from the power line 116, through the cam contact 117, a conductor 185, the normally open side of contacts 167a now closed, the normally open contacts 183b, now closed as relay R183 is still energized at this time, a conductor 186, the normally closed side of contacts 161e, a conductor 187, and through the pick-up coil of the augend sign relay R174 to ground. The energization of relay R174 causes its normally open contacts 174a to close, its contacts 174b to transfer, its normally closed contacts 174c to open, and its contacts 174d to transfer. The closing of the contacts 174a completes a circuit from the power line 116, through the cam contact 126, the isolation rectifier 169, the contacts 174a, and through the hold coil of the relay R174 to ground.

Relay R174 is held energized through cam contact 126 until the end of the tenth cycle point of this machine cycle whereafter it is held energized through cam contact 125 until the end of the 14th cycle point. The opening of the contacts 174c deenergizes relay R183 by opening the hold circuit thereto. Since R174 is energized through the contacts 183b of energized relay R183, whereafter the opening of the contacts 174c of relay R174 deenergizes the relay R183, a relay "race" results. To provide a suitable time lag and insure the energization of relay R174 under these conditions, a recifier 188 is shunted around the hold coil of relay R183 to maintain it energized for a short period after its hold circuit is opened.

It will be noted that the contacts 174b of the augend sign relay R174 and the contacts 168b of the addend sign relay R168 are connected so as to form a logical circuit in the pickup circuit of the subtract relay R158. If either of the relays R174 and R168 are energized when cam contact 127 closes, a circuit is available to pick up relay R158 which in turn effects an inversion of the counter in a manner previously explained. If neither of the relays are energized or if both are energized when cam contact 127 closes, the pick up circuit to relay R158 remains open. With relay R158 unenergized, inversion of the counter is prevented. In this manner, the augend and addend sign relays control the counters so that a correct algebraic sum is generated as determined by the sign of the components. For example, the energization of relay R158 during the second cycle point of the fifth machine cycle indicates that the decimal value "6" already in the accumulating machine is negative. If a negative value is to be entered into the machine during that cycle, the related record card will have a J perforation in the column sensed by the hundreds order brush 114. The sensing of this perforation during the latter part of the second cycle point of that cycle completes a circuit to energize the addend sign relay R168 in the conventional manner. With both relays R174 and R168 energized, the pulse from cam contact 127 during the beginning of the third cycle point will not be able to energize the relay R158. With relay R158 unenergized, the card value and the counter value are accumulated in their true number from as required $(-A-B=-C)$. The negative sign of C is determined during the fourteenth cycle point of this latter machine cycle when the closing of cam contact 128 completes a circuit from the power line 116, through the cam contact 128, the normally open side of contacts R174d, still closed at this time, the normally closed side of contacts R178b, now closed as there was no end carry in this cycle, through the pick up winding of the augend sign control relay R183 to ground. With relay R183 energized, the augend sign relay R174 will be energized during the second cycle point of next cycle in the same manner previously explained.

*Counter readout*

When desired, the total standing in the accumulating machine may be read out and punched into a record card in the same binary coded form as utilized in reading values into the accumulator. The total record card is identical in size and form to the previously described read in cards so that the total records themselves may be used at some future time to read values into the accumulator. A machine (not shown) for punching the records is adapted to advance the total record laterally, J index position first, under a line of electro-magnet controlled punches. A punch is provided for each column of the record and an electromagnet 190 controlling the punch is electrically linked to the related counter as indicated in Fig. 13A. The card feed advancing means of the punch are operatively linked to and timed with the driving gear 49 of the counter by any suitable mechanism (not shown) so that the J, 8, 4, 2 and 1 index positions of the record are successively positioned under the line of punches during the J, 8, 4, 2 and 1 read in time respectively of the counters. The accumulating machine is so arranged that all of the counters are reset to zero during a readout cycle.

In order to facilitate understanding of the counter readout operation, the operation of the machine in reading out the previously generated value −6 (fourth machine cycle) will be explained in detail. The readout cycle is initiated by closing by hand a readout and reset key contact 191. With the contact 191 closed, the closing of cam contact 124 during the latter part of the first cycle point of the readout cycle completes a circuit from the power line 116, through cam contact 124, the contact 191, and through the pick up coil of the exit control relay R161 to ground. The energization of relay R161 causes its normally open contacts 161a, c, and d to close, its normally closed contacts 161b and f to open, and its contacts 161e to transfer. The closing of contacts 161a completes a circuit from the power line 116, through cam contact 126, isolation rectifier 169, conductor 192, the 161a contacts, and through the hold coil of relay R161 to ground. Relay R161 is held energized through cam contact 126 until the end of the tenth cycle point of this cycle whereafter it is held energized through cam contact 125 until the end of the fourteenth cycle point.

The pulse from cam contact 124 which energizes the relay R161 during the latter part of the first cycle point is also applied to the control magnet 76 of each of the counters by a circuit extending from the key contact 191, through an isolation rectifier 194, the conductor 155, the normally closed side of the entry control switch 34 of each counter, and through the related counter magnet 76 to ground. Referring to Fig. 14, it will be noted that the resultant momentary energization of each magnet 76 at this time effects the transfer of both the related entry control switch 34 and the related reset control switch 35 in the manner previously explained. Each entry control switch remains transferred until the beginning of the sixteenth cycle point when it is restored by the high dwell of the associated cam 71 in the manner previously explained. Each reset control switch 35 remains transferred until the beginning of the eighth cycle point when it is restored by the high dwell of the associated cam 73 in the manner previously explained.

During the latter part of the second cycle point of the readout cycle, the momentary closing of cam contact 117 completes a circuit from the power line 116, through the cam contact 117, the conductor 185, the normally open side of contacts 167a, now closed, through the normally open contacts 183b, now closed since the related augend sign relay R183 is energized as a result of the negative sign of the value 6 in the counter, through the conductor 186, the normally open side of contacts 161e, now closed, conductor 195, and through the punch magnet 190 associated with the hundreds order counter to ground. The resultant energization of the punch magnet 190 at this time effects a punching of the J index point position in the related hundreds order column of the total card thus indicating that the total is negative. It will be noted in Fig. 13B that this cam contact 117 pulse which energizes the hundreds order punch magnet is not able to reach the pick up coil of the augend relay R174 (its usual function) because of the transferred contacts 161e. With the augend sign relay unenergized, the subtract relay R158 remains unenergized during the readout cycle even though the sign of the counter is negative. The purpose of this will be later evident.

During the latter part of the fourth cycle point ("8" counter time) of the cycle, the momentary closing of cam contact 117 completes a circuit from the power line 116, through the cam contact 117, the conductor 185, the normally closed side of contacts 167a, conductor 196, the normally open contacts 161d, now closed, conductor 197, the normally closed side of the "8" readout switch 28 of the hundreds order counter, still closed since the related "8" binary readout arm 97 (which is operated at this time as indicated in Fig. 14) finds a binary zero in the related "8" counting wheel, through the normally closed side of the associated "4," "2," and "1" binary readout switches 30, 32 and 33 respectively, through a conductor 198, the normally open side of the reset switch 35 of the hundreds order counter, the normally open side of the related number 1 program contact 31, now closed, the normally open side of the related entry control switch 34, now closed, and through the related magnet 76 to ground. Since the "8" readout arms 97 of the tens and units order counters also find binary zeros in their related counting wheels, a similar circuit is available to the tens and units order counter magnets 76. The impulsing of the magnets 76 of the three counters at this time registers a binary one in their related "8" counting wheels 91 in the manner previously described in detail.

During the latter part of the fifth cycle point ("4" counter time) the momentary closing of cam contact 117 again impulses the hundreds and tens order magnets 76 in the manner previously explained and, as a result, a binary one is registered in the related "4" counting wheels 91. Remembering that the units order counter prior to the readout cycle was indicating 6 in binary coded form, the "4" readout switch of the units order counter is transferred at this time as a result of the binary one standing in that counting wheel. Consequently, the "4" pulse from cam contact 117 does not reach the units order magnet but is by passed through the normally open side of the related "4" switch 30, now closed, and through the associated punch magnet 190 to ground. The resultant energization of the units order punch magnet at this time effects a punching of the "4" index point position in the related units order column of the total card.

During the latter part of the sixth cycle point ("2" counter time), the momentary closing of cam contact 117 impulses the control magnets 76 of the hundreds and tens order counters in the same manner explained above, and a binary one is registered in the related "2" counting wheels. This impulse is, however, by passed through the now transferred "2" switch of the units order counter and is applied to the associated punch magnet 190. The resultant energization of the units order punch magnet at this time effects a punching of the "2" index point position in the related units order column of the total card.

During the latter part of the seventh cycle point, the momentary closing of cam contact 117 again impulses the control magnets of all three counters, since none of them have a binary one in their related "1" counting wheel at that time. As a result of the energization of the magnets 76 at this time, a binary one is then registered in the "1" counting wheel of each counter in a manner previously explained.

As a result of the above operations, a total card having the desired value −6 punched therein has been prepared, and each of the counters is now indicating 15 in binary coded form. The counters are reset to zero during the latter part of the readout cycle in the following manner. The closing of cam contact 131 during the latter part of the tenth cycle point completes a circuit from the power line 116, through cam contact 131, the normally closed side of contacts 158b, the conductor 160, the normally open contacts 161c, now closed, conductor 200, and through the units counter magnet 76 to ground. Since each counter is registering 15 at this time, its related "15's" extend carry switch 29 is transferred. Consequently, the impulse from cam contact 131 is also routed to the tens and hundreds order control magnets 76. Referring to Fig. 14, it will be noted that the energization of the control magnet 76 of each counter at this time permits its related "8," "4," "2," and "1" drive arms 86 to operate. As a result, each counting wheel of the counter is advanced from a binary one to a binary zero indication to reset the counter. It should be noted in Fig.

13A that the normally closed contacts 161b which are open during this cycle as a result of the energization of relay R161, prevents the supplement and correction pulses from cam contact 133 from reaching the counters and interfering with the readout and reset operation. It will be noted also in Fig. 13B, that the contacts 161f (open during the readout and reset operation) prevent the counter reset pulse 131 from energizing the end carry relay 178.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A cyclically operable binary decade counter comprising in combination a series of counting wheels separately advanceable in single step increments to represent alternately a binary one and a binary zero, each of said wheels of the series being assigned a weighted decimal value of successive powers of the base number 2 starting with $2°$ power and representative of the assigned value when indicating a binary one, said series of wheels having a collective capacity greater than ten by some predetermined amount; means operable for separately advancing each of said wheels in single step increments, binary transfer mechanism connecting each of said wheels to the succeeding wheel of the series for rendering the advancing mechanism of a wheel operable to effect a single step advance of that wheel upon a simultaneous advance of the preceding wheel from a binary one to a binary zero position, means for selectively operating said wheel advancing means of any of said wheels but the last of said series, singly or in combination in a predetermined serial manner, to enter any decimal digit 1 to 9 therein; and means controlled by the last wheel of said series for effecting a decimal carry to a succeeding order decade counter when in its binary one position.

2. A cyclically operable decade counter comprising, in combination, a series of binary counting devices, each said devices having two operational positions to which it may be alternately shifted at certain periods in the counter cycle, one of said positions being representative of zero and the alternate position being representative of a value equal to the number two raised to a particular power, said counting devices having a combined capacity greater than 10 by a predetermined amount binary transfer mechanism between each said devices and the succeeding device of said series wherein the shifting of a device from its value representation position to its zero position effects a simultaneous shifting of the succeeding device, an electro-magnet controlled mechanism for effecting a shifting of each said devices at one or a plurality of predetermined periods in said counter cycle when impulsed during said periods, means for producing a series of electrical impulses during said cycle, counter entry means for selectively directing, as determined by the value of a desired entry digit, one or combinations of said series of impulses to said electro magnet to effect a shifting of selected ones of said devices as determined by the periods in the cycle during which said impulses are applied; means for adjusting said entry means to effect the entry of a supplemental value into said counting devices after said digit entry, means controlled by the last binary counting device of said series if shifted to its value representation position as a result of said digit entry or supplement value entry for effecting a decimal carry to a succeeding order counter, and means controlled by said last binary counting device of said series if in its zero representation position after said supplement entry operation for adjusting said entry means to enter a correction value into said counting devices to restore all said binary counting devices but the last of said series to the operational position occupied prior to said supplement value entry, and means for preventing a shifting of the last counting device of said series to its value representation position during said correction value entry.

3. The mechanism of claim 2 further characterized by means for adjusting said counter entry means near the end of the counter cycle to effect a shifting of said last binary counting device of said series from its value representation position to its zero representation position if said device was shifted to said value representation position during the preceding portion of the cycle.

4. A denominational order of a cyclically operable accumulator comprising, in combination, a series of toothed binary counting wheels mounted on a common axis, each of said wheels being advanceable in single steps to alternate binary one and binary zero representative positions with each said wheels being assigned a weighted value of the number two raised to a particular power and representative of that number when indicating a binary one, a pivoted drive arm for each said wheels and adapted to advance said wheel a single step on each operation thereof, an actuating cam for each said drive arms, each said cams containing operational notches engageable by said related arm at predetermined times in the accumulator cycle, a latch device common to all said drive arms for preventing said drive arms from engaging the operational notches in their associated cams, an electro-magnet for releasing said latch device during each application of an electrical impulse thereto, binary transfer means connecting each wheel to the succeeding wheel and comprising a test arm hingedly mounted on each said drive arms and adapted for movement laterally thereto and also for pivotal movement with said drive arm, an operational cam for each said test arms but the first of said series of wheels for shifting said test arm at predetermined periods in the cycle from a normal position wherein the arm projects into the plane of the preceding counting wheel and also into engagement with the test arm of the latter wheel, to a position clear of the plane of said preceding wheel and test arm, a surface of each said arms when in a normal position being aligned with the space between adjacent teeth of the preceding counting wheel if the wheel is positioned in a binary one position and aligned with a flattened portion of a tooth of said wheel for abutment therewith if said wheel is positioned in a binary zero position for preventing possible pivotal movement of that carry arm and its associated drive arm; a series of electrical impulses, and counter entry means for selectively directing one or a combination of said impulses to said electro-magnet in accordance with the value of a desired entry digit, wherein each impulsing of the magnet permits the particular drive arm having its test arm shifted at that time to engage an operational notch in the associated drive cam and effect a single step advance of the associated binary counting wheel, simultaneous operation of the successive drive arm and the arms successive thereto being also permitted by operational notches in their related drive cams, if the then unshifted test arm of each said successive drive arms finds a binary one in the preceding binary counting wheel as that drive arm starts to pivot, and if the preceding drive arm is free to operate so that its associated carry test arm does not impede pivotal movement of the succeeding carry test arm and its associated drive arm.

5. In an accumulator controlled by a record having designations arranged at 4 index point positions according to a 4 hole binary code, representing singly or in combination at least all digits 1 to 9, a denominational order of the accumulator comprising, in combination, a series of four binary counting wheels one for each of said index points, each of said wheels being separately advanceable in steps to represent alternately a binary one and a binary zero, a fifth binary counting member separately advanceable in steps to represent alternately the exceeding or non-exceeding of the counting capacity of said four wheels, said capacity being greater than ten; an actuating device for separately advancing each of said counting wheels in single steps, binary transfer mechanism linking each wheel to the succeeding wheel and linking the last wheel of said series to said fifth counting member, said mechanism being operable to effect a simultaneous advance of a wheel or said fifth counting member upon the advance of the preceding binary counting wheel from a binary one to a binary zero position, means for sensing a record index point by index point for designations therein representative singly or combinationally of any desired entry digit 1 to 9, means controlled by said sensing means for selectively effecting a single operation of each said actuating devices upon the sensing of a designation at the related index point of said record, means controlled by said fifth counting member when indicating an exceeding of the counter capacity for effecting a decimal carry to a succeeding denominational order of the accumulator, means for selectively effecting a single operation of predetermined ones of said actuating devices after said digit entry to enter a supplemental value into the counting wheels, and means for restoring said counting wheels to the positions occupied prior to said supplemental entry if the fifth member is not operated as a result of said supplement entry operation.

6. A plural order decimal accumulator comprising in combination, a binary counting mechanism for each said orders, said mechanism having a capacity of 15, means associated with each said counting mechanisms but the highest order mechanism for effecting a carry into the succeeding order mechanism when the capacity of 15 is exceeded, means associated with said highest order counting mechanism of said accumulator for effecting a carry into the lowest order counting mechanism of said accumulator when its capacity of 15 is exceeded, first reading means for reading a succession of records for decimal amounts recorded therein in binary coded form second reading, means for reading said records for designations representing the algebraic signs of the related amounts; prior to the reading of the amounts; means for determining the algebraic sign of the amount represented in said accumulator, means controlled jointly by said second reading means and said accumulator sign determining means for inverting said accumulator amount on a 15's complement basis if either said accumulator or card amounts are negative, means controlled by said first reading means for causing said amounts read to be entered additively into said accumulator, regardless of its algebraic sign; means controlled jointly by said inverting means if previously actuated and the carry means of each said orders from which a carry was effected as a result of said entry operation for entering a predetermined correction value to said related counter to correct said value represented therein to its 15's complement form, means controlled by said inverting means if previously unactuated for entering a predetermined supplement value into the related counter to force a carry operation from that order if the number represented therein prior to said supplement entry was greater than 9, means controlled by the carry means of each said orders from which a carry is not effected as a result of said supplement entry for effecting the entry of a correction value to said counter to nullify the effect of said supplement value, and means controlled by said inverting means if previously actuated and by the carry means of the highest order counting mechanism if a carry was effected therefrom as a result of said record entry operation, and jointly by the carry means of each said orders from which no carry was effected as a result of said record entry operation, for entering a predetermined correction factor into said last mentioned orders to correct each number represented therein to its true number form in binary notation.

7. The accumulator mechanism of claim 6 further characterized by means controlled jointly by said inverting means if previously actuated, and by the carry means of the highest order counter if no carry was effected therefrom as a result of said record entry operation, for reinverting said counters from their 15's complement form to a true number form in binary coded notation.

8. A plural order, cyclically operable, decimal accumulator comprising, in combination, a series of counting wheels for each said orders, each said wheels being separately advanceable in steps to alternate binary one and binary zero manifestation positions and representative of the number 2 raised to a predetermined power when manifesting a binary one, the different patterns of said two types of manifestations of all but the last wheel of said series being representative of any digit from 1 to 15 in binary form, the alternate binary one and binary zero positions of said last wheel of said series being representative, respectively, of an exceeding or non-exceeding of the capacity of fifteen of the remaining wheels of that series; binary transfer mechanism connecting each of said wheels to the succeeding wheel whereby the advance of a wheel from its binary one manifestation position to the binary zero position effects a simultaneous advance of the succeeding wheel, means controlled by the last of said wheels of each series if advanced to its binary one position during a predetermined portion of the accumulator cycle for effecting a decimal carry operation to the succeeding order counting mechanism, means for sensing a succession of records for amounts recorded therein in binary form, means for sensing said records for designations representing the algebraic signs of the related amounts prior to sensing of said amounts, an addend sign relay controlled by said second sensing means and energized if said record amount is negative, means for determining the algebraic sign of the accumulator setting prior to the sensing of the record amount, an augend relay controlled by said accumulator sign means and energized when said accumulator amount is negative, a subtract control relay, means including points of said addend and augend sign relays connected in a logical circuit and adapted to energize said subtract control relay if either of said sign relays are energized, means controlled by said subtract relay when energized for effecting a simultaneous single step advance of all but the last of said series of counting wheels of each order wherein the previous digit manifestation pattern of each order is inverted on a 15's complement basis prior to the entry of a record amount therein, means controlled by said first sensing means for selectively and serially advancing each said wheels of an order but the last of said series, one step, to enter the record amount therein additively regardless of the algebraic sign of said record amount; means controlled by said last wheel of the series of the highest order of said accumulator if advanced to a binary one position during a predetermined portion of said accumulator cycle for entering a fugitive one into the units order counting mechanism of said accumulator, means controlled by said subtract control relay if not energized during the cycle for entering a +6 supplement value into the related order counter, after the record entry operation, means controlled by said last wheel of each said counters if still indicating a binary zero after said +6 supplement entry for effecting a +10 correction entry into said counter, means controlled by said substract control relay if energized during the cycle and by the last wheel of each said counters if indicating a binary one after said record entry operation for entering a +6 correction value in said counter, and means controlled jointly by said subtract control relay if energized during said cycle, by the last wheel of said highest order counter of the accumulator if positioned to indicate a binary one during a predetermined portion of said cycle, and by the last of each said series of wheels of the remaining orders of the accumulator if indicating a binary zero during a predetermined period of said accumulator cycle, for entering a +10 correction in each said remaining order counting mechanisms.

9. The accumulator mechanism of claim 8 further characterized by means controlled by said subtract control relay if energized during said accumulator cycle for effecting a simultaneous single step advance of all but the last of said series of counting wheels of each order wherein the counters are reinverted from their 15's complement form to true number form, and means controlled by said last wheel of the series of the highest order counter of the accumulator if indicating a binary one during said predetermined portion of the cycle for suppressing said reinvert operation.

10. In a multi-order accumulator each order of which is controlled by designations arranged at 4 index points labeled 8, 4, 2, and 1 in a column of a record, said designations representing singly or in combination at least all of the digits 1 to 9, comprising in combination, a binary counting mechanism for each said orders, each said mechanisms having a capacity of 15, a switch associated with each said counters and closed thereby to indicate 16 when the capacity of the counter is exceeded, a second switch associated with each said counters and closed thereby when the counter is indicating 15, means for sensing the index points of a record in succession to ascertain the presence of designations therein representative of any value from 1 to 9, means controlled by said sensing means for adjusting said counting mechanisms in accordance with value of the designations sensed, means controlled by said 16's switch of each said counters when closed for effecting a decimal carry into the succeeding order counter, means controlled by each said 15's switch, if closed, of said counter receiving said decimal carry for extending said carry to the succeeding order counter, means operable after said record entry operation for effecting the entry of a supplement value 6 into said related counter to effect a closing of said 16's switch if the value previously registered in that counter as a result of the record entry operation exceeded 9, means controlled by said 16's switch of each counter if not closed as a result of said supplement entry operation for effecting the entry of a correction value 10 into said related counter, the cumulative result of the supplement 6 and correction 10 entry being to restore that counter to the value registered therein prior to said supplement entry; means for preventing the closing of said 16's switch as a result of said correction entry operation, and means for opening each 16's switch closed during said cycle prior to the next accumulator cycle.

11. A plural order, cyclically operable binary counting mechanism comprising, in combination, a series of counting wheels, each of said wheels representing a binary order and separately advanceable in steps to alternate binary one and binary zero representative positions, binary transfer mechanism interconnecting each wheel to the succeeding order wheel, record controlled means for selectively effecting a single step advance of said wheels binary order position by binary order position in a predetermined order sequence to enter a number therein in binary coded form, a read-out arm for each of said wheels and engageable therewith to determine whether said wheel is representing a binary one or a binary zero, means for momentarily engaging said arms with their related wheels in the same predetermined order sequence in which said wheels may be advanced during a counter entry operation, a work device, means for initiating a counter read-out cycle, and means controlled by each of said read-out arms during a counter read-out cycle upon the finding of a binary one in the related counter wheel for effecting a simultaneous actuation of said work device.

12. A denominational order of a decimal accumulator comprising, in combination, a series of counting wheels, each of said wheels representing a binary order and separately advanceable in steps to alternate binary one and binary zero representative positions, binary transfer mechanism interconnecting each of said wheels to the succeeding order wheel, record controlled means for selectively effecting a single step advance of all of said wheels but the last wheel of said series, binary order position by binary order position, in a predetermined order sequence to enter a number therein in binary coded form; a read out member engageable with each of said wheels but the last wheel of said series to determine if said wheel is positioned representative of a binary one, means for momentarily engaging each of said members with its related wheel at the same time as said wheel may be advanced as a result of an entry operation, means controlled by the last wheel of said series upon receipt of a binary transfer from the preceding binary order for effecting a decimal carry to a succeeding denominational order of the decimal accumulator, means operable after each record controlled entry operation for effecting the entry of a predetermined supplement value into said counter, binary code position by binary code position, to force a binary transfer to said last wheel if the value represented in said binary counter after said record controlled entry operation exceeded nine in binary coded form; a work device, means operable at the end of a counter entry cycle for effecting a single step advance of said last wheel if previously advanced to a binary one position during said cycle, means for initiating a counter read out cycle, and means controlled by each of said read out members during said read out cycle upon the finding of a binary one in the related counter wheel for effecting a simultaneous actuation of said work device.

13. The mechanism of claim 12 further characterized by means controlled by each of said read out members upon the finding of a binary zero in its related wheel during said read out cycle for effecting a single step advance of said related wheel to its binary one position, and means operable at the end of said read out cycle for effecting a simultaneous single step advance of all of said wheels but the last wheel of said series wherein said counter is reset.

14. A denominational order of an accumulator comprising, in combination, a series of counting wheels, each of said wheels representing a binary order and separately advanceable in steps to alternate binary one and binary zero representative positions, a binary counting member separately advanceable in steps to represent the exceeding or non-exceeding of the counting capacity of said series of counting wheels, said capacity being greater than ten, an actuating device for separately advancing each of said counting wheels in single steps, binary transfer mechanism linking each wheel to the succeeding wheel and linking the last wheel of said series to said binary counting member, said mechanism being operable to effect a simultaneous advance of a wheel or said counting member upon the advance of the preceding counting wheel from a binary one to a binary zero position, counter entry control means for effecting an actuation of said wheel actuating devices, means for adjusting said entry control means to effect a selective single step advance of said wheels in a predetermined order sequence to enter a number therein in binary coded form, means controlled by said counting member when positioned representative of a binary one for effecting a carry to a succeeding denominational order of said accumulator, means for determining the position of each of said wheels at a distinctive predetermined time, a read out control relay for initiating a counter read out cycle when energized, circuit means including a normally open key contact for energizing said relay, a work device for said denominational order counter, and means controlled jointly by said relay when energized and said wheel position determining means at each of said predetermined times if said related wheel represents a binary one for actuating said work device.

15. A denominational order of a binary-decimal counter comprising, in combination, a series of counting wheels separately advanceable in steps to represent alternately one and zero, each of said wheels being assigned a weighted decimal value of successive arithmetically ascending powers of the base number 2 and representative of that number when indicating a one, binary transfer mechanism interconnecting each wheel to the succeeding wheel, means for selectively advancing any of said wheels but the last of said series one step, singly or in combination in a serial manner, to entry any decimal digit 1 to 9 therein; means for effecting the enry of a predetermined supplemental value into said wheels after said digit entry to force a binary transfer into said last wheel if the preceding wheels prior to the supplemental value entry represented a value greater than 9, means controlled by the last wheel of said series if indicating one as a result of the initial or supplemental value entry for effecting a decimal carry to a succeeding denominational order, and means controlled by said last wheel of said series if still indicating zero after said supplemental value entry for effecting the entry of a correction value of predetermined magnitude into said preceding wheels to restore them to the value represented therein prior to said supplemental entry.

16. A decade counter comprising five binary counting wheels each having two operative positions to which it may be moved alternately, means interconnecting said wheels in a series for operation in the binary base notation so that said first wheel operates as a scale of 1 counter, and the second, third, fourth and fifth wheels operate respectively, as scale of 2, 4, 8 and 16 counters with each second operation of a wheel effecting a simultaneous operation or binary carry into the succeeding wheel, means for selectively effecting an operation of said scale of 8, 4, 2 and 1 wheels singly or in combination in serial descending order to enter therein a decimal digit in the binary system of notation, means controlled by said scale of 16 wheel upon receipt of a binary carry from said scale of 8 wheel for effecting a decimal carry to a succeeding order decade counter, means for effecting the entry of a supplemental value 6 into said wheels after the initial entry operation to force a binary carry into said 16 wheel if the preceding wheels prior to the supplemental value entry represented a value greater than 9 and equal to or less than 15, and means controlled by said scale of 16 wheel when indicating 16 as a result of the initial or supplemental value entry for effecting a decimal carry to a succeeding decade counter.

17. The counter mechanism of claim 16 further characterized by means controlled by said scale of 16 wheel if not operated as a result of a binary carry thereto from said scale of 8 wheel during either the initial digit entry or the supplemental 6 entry for effecting the entry of a correction factor 10 into said wheels so that they manifest the same value as prior to said supplement entry.

18. The counter mechanism of claim 16 further characterized by means for restoring said scale of 16 wheel to a zero indication after said supplement entry and prior to the next digit entry.

19. A single order counter comprising a plurality of counting wheels arranged on a common axis, each of said wheels having two numerically representative positions to which it may be alternately advanced, means interconnecting said wheels so as to form a counting train and including means whereby each wheel, except the last in said train, on changing from a chosen numerical representative position to the other position effects an advance of the next wheel in the train, means to selectively advance said wheels serially in a predetermined order to enter a digit therein, means for entering a predetermined supplemental value into said train after said digit entry to force an advance of the last wheel of the train to said chosen position if the preceding wheels thereof prior to said supplemental value entry represented a value greater than a predetermined amount, and means controlled by said last wheel if not in said chosen position after said supplemental entry for effecting the entry of a correction value of predetermined magnitude into said train to restore it to the value represented therein prior to said supplemental value entry.

20. A single order of a counter comprising a plurality of ratchet devices rotatably mounted on a common shaft, said devices being separately advanceable to different ones of either of two "on" or "off" representative positions, means connecting succeeding ratchets on said shaft whereby straight binary operation is effected with and advance of a ratchet from its "on" to its "off" position effecting a simultaneous advance of the succeeding ratchet from its one position to the other position, said ratchets forming a counter having a radix greater than 10 by some predetermined amount, means for selectively advancing said ratchets in a predetermined sequence to enter a decimal digit therein in a binary coded form, means for effecting the entry of a predetermined supplemental value into said ratchets after said digit entry to equate said ratchet capacity to a decimal basis, carry producing means controlled by the assumption of an "on" position of a chosen one of said ratchets to produce a decimal carry into a succeeding higher order counter, and means controlled by said chosen one of the ratchets if in an "off" position after said supplemental entry operation for entering a correction digit into said ratchets to re-equate said counter from said decimal basis to the original radix.

21. A denominational order of an accumulator comprising a series of gears mounted on a common shaft, each said gears being advanceable in single tooth increments to indicate alternately a predetermined weighted value or zero, said gears singly and in combination being adapted to indicate any digit from 0 to 31, differential mechanism interposed between successive gears on said shaft wherever each gear, except the last in said series, on advancing from a numerical representative position to zero effects a simultaneous single tooth advance of the succeeding gear, means for selectively and sequentially effecting a single tooth advance of said gears, except the last in said series, to enter any decimal digit from 1 to 9 therein; means for effecting the entry of a supplemental value six into said wheels after said digit entry, means controlled by the last of said series of gears when said gears combinationally manifest a sum equal to or greater than 16 after said supplemental entry for effecting a decimal carry to a higher order of said accumulator, and means controlled by said last gear of said series if said gears combinationally represent a sum less than 16 after said supplemental entry operation to effect a corrective entry of ten into said gears to cause said gears to combinationally manifest the same value as prior to said supplemental entry.

22. A denominational order of an accumulator comprising five gears rotatably mounted on a common shaft, the first four of said gears being separately advanceable in single steps to indicate alternately a predetermined weighted value or zero, said gears singly and in combination being adapted to indicate any digit from 1 to 15, the last of said gears also being advanceable in single steps to indicate alternately the exceeding or non-exceeding of the 15's capacity of the first four wheels; transfer mechanism between successive gears on said shaft wherein each gear, except the last, on advancing a single step from a numerical value position to a zero position effects a simultaneously single step advance of the succeeding gear; means for selectively and sequentially effecting a single step advance of any of said first four gears to enter a decimal digit from 1 to 9 therein, means controlled by said last gear when positioned indicating an exceeding of the 15's capacity of said first four gears for effecting a decimal carry to a succeeding order of the accumulator, means for effecting an entry of a supplemental value of six into said gears after said digit entry to force said gears to exceed their 15's capacity if they indicated prior to the entry of said supplement value a sum greater than 9 and equal to or less than 15, and means controlled by said last gear if not indicating an exceeding of 15 after said supplement entry for effecting the entry of ten into said gears to restore them to the value represented therein prior to said supplement entry.

References Cited in the file of this patent

FOREIGN PATENTS 678,427    Great Britain _____ Sept. 3, 1952